US009661604B1

(12) United States Patent
O'Shea et al.

(10) Patent No.: US 9,661,604 B1
(45) Date of Patent: May 23, 2017

(54) DETERMINING EMITTER LOCATIONS

(71) Applicant: HawkEye 360, Inc., Herndon, VA (US)

(72) Inventors: Timothy James O'Shea, Arlington, VA (US); Robert W. McGwier, Elliston, VA (US); Nicholas Aaron McCarthy, Arlington, VA (US)

(73) Assignee: HawkEye 360, Inc., Herndon, VA (US)

( * ) Notice: Subject to any disclaimer, the term of this patent is extended or adjusted under 35 U.S.C. 154(b) by 0 days.

(21) Appl. No.: 15/369,228

(22) Filed: Dec. 5, 2016

Related U.S. Application Data

(60) Provisional application No. 62/357,082, filed on Jun. 30, 2016.

(51) Int. Cl.
*H04W 64/00* (2009.01)
*H04W 24/10* (2009.01)

(52) U.S. Cl.
CPC ........... *H04W 64/00* (2013.01); *H04W 24/10* (2013.01)

(58) Field of Classification Search
CPC ....... H04W 64/00; H04W 24/10; G01S 7/062; G01S 5/06; G01S 3/48; G01S 1/02; G01S 5/025
USPC ........ 455/517; 342/181, 387, 442, 450, 451, 342/465
See application file for complete search history.

(56) References Cited

U.S. PATENT DOCUMENTS

| | | | | |
|---|---|---|---|---|
| 3,745,571 A | * | 7/1973 | Chwastyk | G01S 13/524 342/162 |
| 4,057,800 A | * | 11/1977 | Ganz | G01S 13/227 342/116 |
| 5,008,679 A | * | 4/1991 | Effland | G01S 5/06 342/353 |
| 5,317,323 A | * | 5/1994 | Kennedy | G01S 5/06 342/357.31 |
| 5,373,236 A | * | 12/1994 | Tsui | G01R 19/175 324/76.24 |
| 5,406,291 A | * | 4/1995 | Guerci | G01S 5/02 342/424 |
| 5,534,866 A | * | 7/1996 | Rose | G01S 7/021 342/13 |

(Continued)

OTHER PUBLICATIONS

Anthony J. Weiss, "Direct Geolocation of Wideband Emitters Based on Delay and Doppler", Jun. 2011, IEEE Transactions on signal Processing, vol. 59, No. 6, pp. 2513-2521.*

*Primary Examiner* — Hai V Nguyen
(74) *Attorney, Agent, or Firm* — Fish & Richardson P.C.

(57) ABSTRACT

First information corresponding to a radio signal received at a first sensing device from a candidate location is obtained. Second information corresponding to a radio signal received at a second sensing device from the candidate location is obtained. A first relationship between the first sensing device and the candidate location and a second relationship between the second sensing device and the candidate location are determined. A first inverse and a second inverse of respectively the first and second relationships are obtained. A first estimate of the radio signal at the first sensing device is determined from the first information and the first inverse. A second estimate of the radio signal at the second sensing device is determined from the second information and the second inverse. Energy emitted from the candidate location is measured based on the first estimate and the second estimate.

30 Claims, 6 Drawing Sheets

(56) References Cited

U.S. PATENT DOCUMENTS

| | | | | |
|---|---|---|---|---|
| 5,570,099 A * | 10/1996 | DesJardins | G01S 5/06 | 342/378 |
| 5,673,305 A * | 9/1997 | Ross | B60R 25/102 | 340/426.16 |
| 5,686,888 A * | 11/1997 | Welles, II | B61L 25/025 | 340/3.31 |
| 5,734,478 A * | 3/1998 | Magome | G03F 9/7049 | 250/548 |
| 5,774,087 A * | 6/1998 | Rose | G01S 7/021 | 342/113 |
| 5,835,060 A * | 11/1998 | Czarnecki | G01S 5/04 | 342/424 |
| 5,874,916 A * | 2/1999 | Desjardins | G01S 1/045 | 342/378 |
| 5,914,687 A * | 6/1999 | Rose | G01S 5/12 | 342/424 |
| 6,239,748 B1 * | 5/2001 | Gilhousen | G01S 5/06 | 342/442 |
| 6,433,740 B1 * | 8/2002 | Gilhousen | G01S 5/06 | 342/387 |
| 6,470,097 B1 * | 10/2002 | Lai | G06T 5/003 | 382/236 |
| 6,577,272 B1 * | 6/2003 | Madden | G01S 3/50 | 342/387 |
| 6,677,893 B2 * | 1/2004 | Rideout | G01S 5/06 | 342/353 |
| 6,683,568 B1 * | 1/2004 | James | G01S 5/02 | 342/387 |
| 6,734,824 B2 * | 5/2004 | Herman | G01S 5/06 | 342/175 |
| 7,091,926 B2 * | 8/2006 | Kulas | G06F 3/1446 | 345/1.1 |
| 7,236,119 B2 * | 6/2007 | Gounalis | G01S 7/021 | 342/13 |
| 7,256,737 B2 * | 8/2007 | Hall | G01S 5/0205 | 342/387 |
| 7,342,536 B2 * | 3/2008 | Johnson | G01S 5/0205 | 342/442 |
| 7,440,762 B2 * | 10/2008 | Maloney | G01S 19/09 | 342/357.29 |
| 7,508,344 B2 * | 3/2009 | Stroud | G01S 5/06 | 342/387 |
| 7,561,105 B2 * | 7/2009 | Murphy | G01S 5/06 | 342/465 |
| 7,579,989 B2 * | 8/2009 | Winterling | G01S 5/04 | 342/450 |
| 7,626,536 B1 * | 12/2009 | Rihaczek | G01S 3/46 | 342/107 |
| 7,626,538 B2 * | 12/2009 | Rose | G01S 3/46 | 342/104 |
| 7,626,546 B2 * | 12/2009 | Chung | G01S 5/0009 | 342/465 |
| 7,916,085 B2 * | 3/2011 | Kimball | G01S 3/04 | 342/451 |
| 7,925,274 B2 * | 4/2011 | Anderson | G01S 19/09 | 455/432.1 |
| 8,004,464 B2 * | 8/2011 | Koutsogiannis | G01S 13/003 | 342/453 |
| 8,059,700 B2 * | 11/2011 | Lopez-Risueno | G01C 21/206 | 375/135 |
| 8,090,384 B2 * | 1/2012 | Alles | G01S 5/021 | 370/310 |
| 8,160,609 B2 * | 4/2012 | Alles | G01S 5/06 | 455/456.1 |
| 8,164,519 B1 * | 4/2012 | Bedoya Martinez | G01S 19/24 | 342/357.69 |
| 8,188,920 B2 * | 5/2012 | Thomson | G01S 5/02 | 342/450 |
| 8,193,981 B1 * | 6/2012 | Hwang | G01S 5/06 | 342/357.63 |
| 8,249,622 B2 * | 8/2012 | Alles | G01S 5/06 | 455/456.1 |
| 8,289,210 B2 * | 10/2012 | Thomson | G01S 5/02 | 342/451 |
| 8,351,961 B2 * | 1/2013 | Olbers | H04W 12/12 | 455/26.1 |
| 8,380,222 B2 * | 2/2013 | Alles | G01S 5/06 | 455/456.1 |
| 8,477,877 B2 * | 7/2013 | Zhou | H04B 10/611 | 375/136 |
| 8,489,122 B2 * | 7/2013 | Gravely | G01S 5/14 | 455/456.1 |
| 8,559,491 B2 * | 10/2013 | Chevalier | G01S 7/292 | 342/104 |
| 8,565,798 B2 * | 10/2013 | Parker | H01Q 3/2611 | 342/181 |
| 8,682,182 B2 * | 3/2014 | Zhou | H04B 10/611 | 398/202 |
| 8,837,947 B2 * | 9/2014 | Gabory | H04L 25/4904 | 398/183 |
| 8,861,647 B2 * | 10/2014 | Zhou | H04B 10/611 | 375/260 |
| 8,866,672 B2 * | 10/2014 | Stroud | G01S 1/04 | 342/378 |
| 8,878,725 B2 * | 11/2014 | Lu | G01S 1/04 | 342/450 |
| 8,897,813 B2 * | 11/2014 | Hannan | H04W 64/00 | 370/338 |
| 8,908,809 B2 * | 12/2014 | Zhou | H04B 10/6165 | 375/324 |
| 8,930,088 B2 * | 1/2015 | Bauer | B64D 11/00 | 701/13 |
| 8,996,031 B2 * | 3/2015 | Austin | G01S 5/0063 | 455/456.1 |
| 9,035,762 B2 * | 5/2015 | Cutler | H04B 17/27 | 340/539.13 |
| 9,086,471 B2 * | 7/2015 | Mengwasser | H04B 7/18515 | |
| 9,203,511 B2 * | 12/2015 | Zhou | H04B 10/611 | |
| 9,240,628 B2 * | 1/2016 | Duncan | H01Q 1/288 | |
| 9,279,880 B2 * | 3/2016 | McCorkle | G01S 3/146 | |
| 9,331,798 B2 * | 5/2016 | Beck | H04B 17/309 | |
| 9,523,761 B1 * | 12/2016 | Hoffmann | G01S 5/06 | |
| 2003/0151562 A1 * | 8/2003 | Kulas | G06F 3/1446 | 345/1.1 |
| 2004/0027276 A1 * | 2/2004 | Herman | G01S 5/06 | 342/181 |
| 2004/0075605 A1 * | 4/2004 | Bradford | G01S 7/4004 | 342/95 |
| 2004/0189525 A1 * | 9/2004 | Beadle | G01S 3/14 | 342/451 |
| 2005/0148346 A1 * | 7/2005 | Maloney | G01S 19/09 | 455/456.6 |
| 2006/0273960 A1 * | 12/2006 | Murphy | G01S 5/06 | 342/465 |
| 2007/0120738 A1 * | 5/2007 | Stroud | G01S 5/06 | 342/387 |
| 2007/0189404 A1 * | 8/2007 | Baum | H04L 27/2613 | 375/260 |
| 2008/0248811 A1 * | 10/2008 | Maloney | G01S 19/09 | 455/456.1 |
| 2009/0168730 A1 * | 7/2009 | Baum | H04L 5/0007 | 370/336 |
| 2010/0061427 A1 * | 3/2010 | Lopez-Risueno | G01C 21/206 | 375/150 |
| 2011/0280293 A1 * | 11/2011 | Chevalier | G01S 7/292 | 375/224 |
| 2012/0293371 A1 * | 11/2012 | Lu | G01S 1/04 | 342/387 |
| 2012/0320442 A1 * | 12/2012 | Gabory | H04L 27/2096 | 359/238 |
| 2013/0265198 A1 * | 10/2013 | Stroud | G01S 1/04 | 342/378 |
| 2014/0278214 A1 * | 9/2014 | Broad | G01S 3/50 | 702/150 |
| 2014/0361939 A1 * | 12/2014 | Duncan | H01Q 1/288 | 343/707 |
| 2015/0241545 A1 * | 8/2015 | Lehtomaki | G01S 3/14 | 342/417 |

(56) References Cited

U.S. PATENT DOCUMENTS

| | | | |
|---|---|---|---|
| 2015/0319634 A1* | 11/2015 | Zwirn | G01S 11/02 370/252 |
| 2015/0326273 A1* | 11/2015 | Rakib | H04L 5/0048 375/131 |
| 2016/0018509 A1* | 1/2016 | McCorkle | G01S 3/146 342/386 |
| 2016/0033649 A1* | 2/2016 | Mathews | G01S 5/021 342/357.48 |
| 2016/0036957 A1* | 2/2016 | Van Meter, II | H04W 4/14 455/557 |
| 2016/0119806 A1* | 4/2016 | Carbajal | H04W 24/08 455/67.11 |
| 2016/0146923 A1* | 5/2016 | McCorkle | G01S 3/146 342/442 |
| 2016/0204861 A1* | 7/2016 | Boroson | H04B 10/1121 398/96 |
| 2016/0204865 A1* | 7/2016 | Boroson | H04B 10/1121 398/97 |
| 2016/0204866 A1* | 7/2016 | Boroson | H04B 10/1121 398/97 |
| 2016/0299212 A1* | 10/2016 | Broad | G01S 5/04 |
| 2017/0003376 A1* | 1/2017 | Wellman | G01S 5/0221 |

* cited by examiner

DETERMINING EMITTER LOCATIONS

CROSS REFERENCE TO RELATED APPLICATIONS

This application claims the benefit of priority under 35 U.S.C. §119(e) of U.S. Provisional Application No. 62/357,082, filed on Jun. 30, 2016, and entitled "Determining Emitter Locations," which is incorporated herein by reference in its entirety.

TECHNICAL FIELD

The following disclosure relates generally to systems and techniques for determining emitter locations.

BACKGROUND

Various electrical devices emit radio signals. For example, communications radios, emergency safety beacons, radars, television broadcast towers, wireless access points, cellular towers, cellular phones, and satellite phones, among other radio emitters, transmit radio signals that can be received by other devices.

SUMMARY

The present disclosure describes devices, systems and techniques for determining locations of electrical devices based on receiving the radio signals emitted by the electrical devices at two or more sensing devices that are synchronized with one another. The radio signals received by the two or more sensing devices are processed using blind coherent integration (BCI) techniques to estimate energies of the emitted radio signals. A search is performed using the estimated energies and based on known candidate locations to determine the actual locations of the electrical devices from which the radio signals are received. In this context, an electrical device emitting a radio signal is also referred to as an emitter or a wireless transmitter, while a sensing device receives radio signals from an emitter using one or more radio signal receivers that are referred to as sensors.

In some implementations, the sensors are located on board two or more mobile platforms. The mobile platforms receive radio signals from emitters on the Earth's surface, and process the signals, either on board one of the mobile platforms, or by sending the received signals to a processing station. The mobile platforms are configured such that the system clocks on the different mobile platforms are synchronized with one another. In some implementations, when processing the received signals, a determination is made whether the signal reception times measured by the mobile platforms are consistent with one another, e.g., whether the system clocks on the mobile platforms are synchronized with one another. In some implementations, the mobile platforms are orbiting satellites. In such implementations, the corresponding process station is a satellite ground station.

In a general aspect, first information is obtained from a first sensing device, the first information corresponding to a radio signal received at the first sensing device from a candidate location. Second information is obtained from a second sensing device, the second information corresponding to a radio signal received at the second sensing device from the candidate location. A first relationship between the first sensing device and the candidate location and a second relationship between the second sensing device and the candidate location are determined. A first inverse of the first relationship and a second inverse of the second relationship are obtained. A first estimate of the radio signal received at the first sensing device from the candidate location is determined based on the first information and the first inverse. A second estimate of the radio signal received at the second sensing device from the candidate location is determined based on the second information and the second inverse. Energy emitted from the candidate location is measured based on the first estimate and the second estimate.

Particular implementations may include one or more of the following features. Determining the first relationship between the first sensing device and the candidate location may comprise determining a delay associated with the radio signal received at the first sensing device from the candidate location, and determining a Doppler offset associated with the radio signal received at the first sensing device from the candidate location. Obtaining the first inverse of the first relationship may comprise determining an inverse of the delay associated with the radio signal received at the first sensing device from the candidate location, and determining an inverse of the Doppler offset associated with the radio signal received at the first sensing device from the candidate location. At least one of the delay or the Doppler offset may be determined based on a known trajectory of the first sensing device.

Obtaining the first inverse of the first relationship may comprise obtaining a prediction of the candidate location. Knowledge of a trajectory of the first sensing device may be obtained. A position of the first sensing device at a first time may be determined based on the knowledge of the trajectory. The first inverse of the first relationship may be obtained based on the prediction of the candidate location and the position of the first sensing device at the first time. Determining the first estimate of the radio signal may comprise computing a convolution of: (i) the first information corresponding to the radio signal received at the first sensing device and (ii) the first inverse of the first relationship that is based on the prediction of the candidate location and the position of the first sensing device at the first time.

Determining the second relationship between the second sensing device and the candidate location may comprise determining a delay associated with the radio signal received at the second sensing device from the candidate location, and determining a Doppler offset associated with the radio signal received at the second sensing device from the candidate location. Obtaining the second inverse of the second relationship may comprise determining an inverse of the delay associated with the radio signal received at the second sensing device from the candidate location, and determining an inverse of the Doppler offset associated with the radio signal received at the second sensing device from the candidate location. At least one of the delay or the Doppler offset may be determined based on a known trajectory of the second sensing device.

Obtaining the second inverse of the second relationship may comprise obtaining a prediction of the candidate location. Knowledge of a trajectory of the second sensing device may be obtained. A position of the second sensing device may be determined at a first time based on the knowledge of the trajectory. The second inverse of the second relationship may be obtained based on the prediction of the candidate location and the position of the second sensing device at the first time. Determining the second estimate of the radio signal may comprise computing a convolution of: (i) the second information corresponding to the radio signal received at the second sensing device and (ii) the second inverse of the second relationship that is based on the prediction of the candidate location and the position of the second sensing device at the first time.

Determining the first estimate of the radio signal received at the first sensing device from the candidate location based on the first inverse may comprise applying one or more of a time interpolation, re-sampling and shifting process to the first inverse, and mixing the first inverse with a local digital oscillator. Determining the second estimate of the radio signal received at the second sensing device from the candidate location based on the second inverse may comprise applying one or more of a time interpolation, re-sampling and shifting process to the second inverse, and mixing the second inverse with a local digital oscillator.

Measuring the energy emitted from the candidate location based on the first estimate and the second estimate may comprise determining a distance metric between the first estimate and the second estimate, and measuring the energy as a function of the distance metric. The distance metric may be based on a coherent reception of the radio signal at the first sensing device and the second sensing device. A clock corresponding to the first sensing device may be synchronized with a clock corresponding to the second sensing device. The distance metric may include one of an L2 error distance or a complex cross power distance.

Energy emitted from a plurality of candidate locations may be measured, wherein radio signals from the plurality of candidate locations may be received at a plurality of sensing devices including the first sensing device and the second sensing device, and wherein information corresponding to the radio signals from the plurality of candidate locations may be obtained from the plurality of sensing devices. An energy profile for a geographic region may be generated based on the measurement of energy emitted from the plurality of candidate locations.

An energy density for the geographic region may be determined, wherein the energy density is proportional to a number of the candidate locations corresponding to which emitted energy are measured. A first search area in the geographic region associated with a first candidate location may be identified based on the determination of the energy density. A search in the first search area may be performed for a target signal transmitter associated with the first candidate location.

Performing the search for signal transmitters in the first search area may comprise determining a highest value of energy emitted from candidate locations in the first search area. A candidate location corresponding to the highest value of energy may be identified as actual location of the target signal transmitter.

Performing the search for signal transmitters in the first search area may comprise determining a highest value of energy emitted from candidate locations in the first search area. A candidate location corresponding to the highest value of energy may be identified. A second search area in the geographic region associated with the identified candidate location may be identified, wherein the second search area corresponds to a sub-region of the first search area. A search may be performed in the second search area for the target signal transmitter. A highest value of energy emitted from candidate locations in the second search area may be determined. A candidate location corresponding to the highest value of energy may be identified as actual location of the target signal transmitter.

Energy emitted from candidate locations in the first search area may be compared to a threshold energy value. A subset of candidate locations in the first search area with emitted energy greater than the threshold energy value may be determined. A second search area associated with the subset of candidate locations may be identified. A search may be performed in the second search area for the target signal transmitter.

The first sensing device may include a sensor on a first spacecraft. Obtaining the first information corresponding to the radio signal received at the first sensing device from the candidate location may comprise obtaining, at a ground receiving station that is communicably coupled to the first spacecraft, the first information from the first spacecraft. The second sensing device may include a sensor on a second spacecraft that is communicably coupled to the ground receiving station. Obtaining the second information corresponding to the radio signal received at the second sensing device from the candidate location may comprise obtaining, at the ground receiving station, the second information from the second spacecraft. The first spacecraft and the second spacecraft may include at least one of a Low Earth Orbit (LEO) satellite, a Medium Earth Orbit (MEO) satellite, a Geosynchronous Orbit (GEO) satellite, or a nano satellite.

The first sensing device may include a sensor on a first mobile platform. Obtaining the first information corresponding to the radio signal received at the first sensing device from the candidate location or obtaining the second information corresponding to the radio signal received at the second sensing device from the candidate location may comprise obtaining, at a ground receiving station that is communicably coupled to the first mobile platform, the first information from the first mobile platform. The second sensing device may include a sensor on a second mobile platform that is communicably coupled to the ground receiving station. Obtaining the second information corresponding to the radio signal received at the second sensing device from the candidate location may comprise obtaining, at the ground receiving station, the second information from the second mobile platform. The first mobile platform and the second mobile platform may include at least one of a Low Earth Orbit (LEO) satellite, a Medium Earth Orbit (MEO) satellite, a Geosynchronous Orbit (GEO) satellite, a nano satellite, an unmanned aerial vehicle (UAV) or a terrestrial vehicle.

Obtaining the first information corresponding to the radio signal received at the first sensing device from the candidate location may comprise obtaining, at a computing unit onboard the first sensing device, the first information corresponding to the radio signal from a sensor coupled to the first sensing device. The first sensing device may be communicably coupled to the second sensing device. Obtaining the second information corresponding to the radio signal received at the second sensing device from the candidate location may comprise receiving, at a network interface of the first sensing device from the second sensing device, the second information from the second sensing device. The second information may be sent from the network interface of the first sensing device to the computing unit onboard the first sensing device. At least one of the first sensing device or the second sensing device may include one of a spacecraft or a mobile platform.

A clock of the first sensing device may be synchronized with a clock of the second sensing device. A clock of the first sensing device and a clock of the second sensing device may be synchronized with a reference clock. The reference clock may be associated with one of a Global Navigation Satellite System (GNSS) signal or a Global Positioning System (GPS) signal. Alternatively, the clock of one of the sensing devices may be used as the reference clock, to which the clock of the other sensing device is synchronized.

Determining that the clock corresponding to the first sensing device is synchronized with the clock corresponding to the second sensing device may comprise receiving, from the first sensing device, a first signal indicating that the clock corresponding to the first sensing device is synchronized with the reference clock, and receiving, from the second sensing device, a second signal indicating that the clock corresponding to the second sensing device is synchronized with the reference clock. Based on receiving the first signal and the second signal, a determination may be made that the clock corresponding to the first sensing device is synchronized with the clock corresponding to the second sensing device.

An instruction signal may be sent to each of the first sensing device and the second sensing device. The instruction signal may direct the respective sensing devices to synchronize the corresponding clocks with the reference clock.

Measuring the energy emitted from the candidate location may further comprises obtaining, from one or more additional sensing devices, additional information corresponding to radio signals received at the one or more additional sensing devices from the candidate location. A determination may be made that one or more clocks corresponding to the one or more additional sensing devices are synchronized with the clocks corresponding to at least one of the first sensing device or the second sensing device. One or more relationships between the one or more additional sensing devices and the candidate location may be determined. One or more inverses of the one or more relationships between the one or more additional sensing devices and the candidate location may be obtained. One or more estimates of the radio signals received at the one or more additional sensing devices from the candidate location based on the additional information and the one or more inverses may be determined. Conditioned on determining that the one or more clocks corresponding to the one or more additional sensing devices are synchronized with the clocks corresponding to at least one of the first sensing device or the second sensing device, the energy emitted from the candidate location may be measured based on the first estimate, the second estimate and the one or more estimates of the radio signals received at the one or more additional sensing devices from the candidate location.

Implementations of the above techniques include methods, apparatus, computer program products and systems for performing the above-described actions. Such a computer program product is embodied in a non-transitory machine-readable medium that stores instructions executable by one or more processors. The instructions are configured to cause the one or more processors to perform the above-described actions. One such system includes two or more sensing devices and one or more computing units that are configured to perform the above-described actions upon receiving radio signals from the sensing devices.

In some implementations, the systems and techniques described herein are used to perform general mapping and geolocation of coherent radio energy emitted from any stable location, e.g., on the Earth's surface. This is used to map commercial radio usage, deployment, spectrum occupancy and regulatory compliance for a wide range of commercial and other applications, among others. In contrast to other approaches, the systems and techniques described herein can perform accurate mapping and geolocation of emitters without using specific knowledge about the emitter signals. Additionally or alternatively, the systems and techniques described herein can perform mapping and geolocation of emitters without relying on information about direction of arrival of energy signals. Accordingly, the systems and techniques are useful for performing mapping and geolocation using spacecraft, e.g., satellites, which do not separate multiple signals arriving at the spacecraft.

The systems and techniques described herein can also improve the hardware functionality of the associated sensing devices. For example, the processing speed of the sensing devices to perform geolocation can be improved, compared to conventional approaches. Additionally or alternatively, the systems and techniques can provide accurate results using sensing devices with limited hardware resources. The energy spent by the sensing devices to process the emitter signals and perform geolocation and mapping also can be reduced, compared to conventional approaches. This is useful for spacecraft, e.g., satellites, which have limited processing resources and constrained energy sources.

Another advantage of the systems and techniques described herein is that the systems and techniques enable sensing of emitter signals without requiring any prior knowledge of the signal type, emitter structure, or signal content. The blind coherent integration approaches described herein allow estimation of time or frequency of arrival of emitter signals without dependence on knowledge of the signal format or structure, in contrast to convention approaches that depend on such knowledge of the signal format or structure.

The details of one or more disclosed implementations are set forth in the accompanying drawings and the description below. Other features, aspects, and advantages will become apparent from the description, the drawings and the claims.

DETAILED DESCRIPTION

Figure 1:
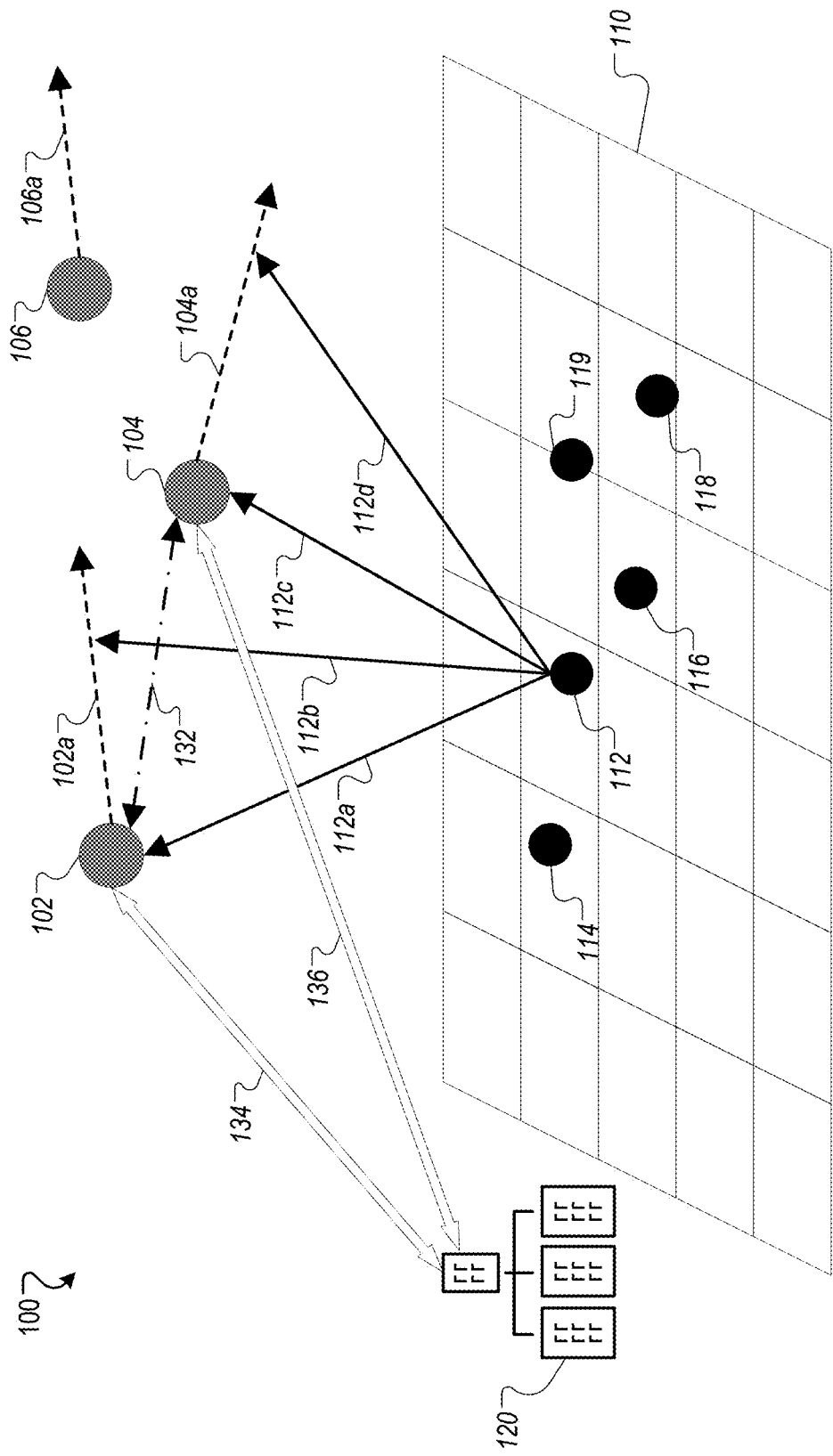
FIG. 1 illustrates an example of a system for determining emitter locations, according to one or more implementations.

Radio geolocation, also referred to simply as geolocation, refers to operations to locate a radio emitter based on analyzing signals emitted by the radio emitter. Geolocation is useful for radio spectrum access enforcement, commercial radio use analytics, and security applications where determination of the location of an emitter sending radio signals is important. In some cases, locations of radio emitters are determined using one or more of time of arrival, frequency of arrival, time-difference and frequency-difference of arrival combined with reverse trilateration. These techniques are based on the ability to know what the underlying signal from an emitter looks like, and the ability to tag or correlate a unique time instant for a small set of signals that can be used in calculations. However, for situations where the signal is very weak, e.g., below the noise floor and/or with strong co-channel interference from many other spatially distinct emitters on the same frequency, the above approaches do not provide sufficient processing gain to be able to accurately estimate radio emitter locations for many applications. As described in greater detail in the following sections, in some implementations, techniques, which are referred to as Blind Coherent Integration (BCI) techniques are used to determine emitter locations in situations where the signals from the emitters are weak. In this context, a BCI technique describes a technique that can perform coherent integration of a known radio signal propagation path by estimating candidate locations of the source of the radio signal.

In some implementations, the BCI techniques described herein accurately predict the time delay due to propagation distance that is associated with signals from an emitter that is to be detected, and the Doppler frequency offset trajectories due to relative motion of locations on the ground throughout a period of time during some sensing device flight or overpass corresponding to the location of the emitter. By coherently integrating the signals received at the sensing device, with these delays and Doppler offset effects from the real radio channel inverted and removed from predicted estimates, only signals from a specific target spot on the ground add coherently (indicating the inverted channel effects of the candidate location, e.g., application of a channel response that inverts and removes non-random channel response effects associated with propagation of the target signal, is the right one), while other locations cancel over time due to non-coherent addition of random delay and phase response from multiple sensors. In this manner, the BCI techniques described herein perform general mapping and geolocation of coherent radio energy emitted by an emitter. As indicated above, the BCI techniques provide geolocation of radio signals of unknown or hard to predict structures, such as communications radios, emergency safety beacons, radar emissions, or other radio emitters. In some implementations, a target emitter that is to be detected corresponds to a stable location on earth, e.g., the emitter is stationary or is slowly moving relative to the movement of the sensors that detect the radio signals from the emitter.

FIG. 1 illustrates an example of a system 100 for determining emitter locations, according to one or more implementations. The system 100 includes sensing devices 102, 104 and 106, an area 110 that includes a plurality of emitters that are indicated by candidate emitter locations 112, 114, 116, 118 and 119, and a receiver station 120.

In some implementations, the sensing devices 102, 104 and 106 are mobile apparatus, such as spacecraft, aerial vehicles, terrestrial vehicles, or some or suitable mobile platforms. For example, the sensing devices 102, 104 and 106 are satellites in some implementations. Alternatively, the sensing devices 102, 104 and 106 are cars or trucks. Alternatively, the sensing devices 102, 104 and 106 are aerial vehicles such as airplanes, or unmanned aerial vehicles (UAVs) such as drones or balloons. In some implementations, the sensing device 102 is a first type of mobile platform, while the sensing devices 104 and 106 are a second type of mobile platform that is different from the first type of mobile platform. For example, the sensing device 102 can be a satellite, while the sensing devices 104 and 106 can be terrestrial vehicles, or vice versa. Alternatively, the sensing device 102 can be a satellite, the sensing device 104 can be a terrestrial vehicle, and the sensing device 106 can be an UAV.

Each sensing device includes one or more radio signal receivers, also referred to as sensors, which are configured to receive radio signals from emitters. In some implementations, the sensors correspond to radio frequency (RF) antennas coupled to transponders and/or network interfaces on board the sensing devices. Each sensing device also includes other hardware components, such as a digitizer (e.g., an analog to digital converter, or ADC) that converts the received analog radio signals to digital format, one or more processors, and memory that stores instructions corresponding to operations performed by the sensing device, and also stores the radio signal data and/or processed information generated based on the radio signal data.

Although three sensing devices 102, 104 and 106 are shown, in some implementations the system 100 includes a different number of sensing devices. For example, the system 100 can include two sensing devices (e.g., 102 and 104) or four or more sensing devices.

In some implementations, the area 110 is a geographic region on the Earth's surface. In some implementations, the area 110 is a region of space that is proximate to the Earth's surface, e.g., at a height of a few feet to a few tens or hundreds of feet above ground. The emitters corresponding to the candidate locations 112, 114, 116, 118 and 119 include one or more of emergency safety beacons, radars, television broadcast towers, wireless access points, wireless transmitters, cellular towers, cellular phones, and satellite phones, among other radio emitters. In some implementations, different emitters corresponding to the candidate locations 112, 114, 116, 118 and 119 are of different types. In other implementations, the emitters corresponding to the candidate locations 112, 114, 116, 118 and 119 are of the same type. Each emitter includes hardware, such as one or more communications radios, which transmit radio signals that can be received by other devices, such as the sensing devices 102, 104 and/or 106.

The sensing devices 102, 104 and 106 are mobile, with sensing device 102 moving with a trajectory 102a, sensing device 104 moving with a trajectory 104a and sensing device 106 moving with a trajectory 106a. Depending on the type of the sensing device, the movement of the sensing devices 102, 104 and 106 are in space in some implementations, or on the terrestrial surface in some other implementations. In implementations where one or more of the sensing devices are aerial platforms, the sensing devices follow trajectories through space. For example, the sensing devices can include satellites that follow orbital trajectories with respect to the Earth's surface. Alternatively, in implementations where one or more of the sensing devices are terrestrial vehicles, the sensing devices follow trajectories on the ground. For example, the sensing devices can include cars or trucks that travel on the Earth's surface, either along marked roads or on unmarked areas. As another example, the sensing devices can include boats or ships that travel on water, such as the oceans.

During movement of the sensing devices 102, 104 and 106 along their respective trajectories, the sensing devices receive radio signals from one or more emitters located at one or more of the candidate locations 112, 114, 116, 118 and 119. For example, during a known time interval, the sensing device 102 receives radio signal 112a from an emitter at candidate location 112 when the sensing device 102 is at a first location in its trajectory 102a, and subsequently receives radio signal 112b from the emitter at the candidate location 112 when the sensing device 102 is at a second location in its trajectory 102a during the time interval. The sensing device 104 receives radio signal 112c from the emitter at the candidate location 112 when the sensing device 104 is at a first location in its trajectory 104a, and subsequently receives radio signal 112d from the emitter at the candidate location 112 when the sensing device 104 is at a second location in its trajectory 104a. In some implementations, one of the radio signals 112a or 112b is same as one of the radio signals 112c or 112d. For example, a signal emitted by the emitter at the candidate location 112 at a time instant and received by the sensing device 102 can be referred to as the radio signal 112a, while the same signal received by the sensing device 104 can be referred to as the radio signal 112c. Additionally or alternatively, a signal emitted by the emitter at the candidate location 112 at a second time instant and received by the sensing device 102 can be referred to as the radio signal 112b, while the same signal received by the sensing device 104 can be referred to as the radio signal 112d. One or more of the sensing devices 102, 104 and 106 can similarly receive radio signals from other emitters while moving along their respective trajectories.

Time delay and Doppler frequency offset trajectories are computed for the sensing devices based on the received signals along the paths to specific candidate spots in the area 110. In this context, time delay is due to the propagation of electromagnetic waves through free space as they travel between an emitter and a receiving sensor. The Doppler frequency offset refers to the translation of the center frequency of a signal due to relative velocity differences between the signal emitter and the sensor receiving the signal. By computing the time delay and Doppler frequency offset trajectories from the known paths of the sensing devices, signals arriving from a particular location can be coherently added. For example, time delay and Doppler frequency offset trajectories are computed for the sensing devices 102 and 104 based on their known trajectories 102a and 104a respectively. Following computation of the time delay and Doppler frequency offset trajectories for the sensing devices 102 and 104, the signals from the emitter at the candidate location 112 that are received at the sensing device 102 (e.g., on one or more of the radio signals 112a and 112b), and the signals from the emitter at the candidate location 112 that are received at the sensing device 104 (e.g., one or more of the radio signals 112c and 112d) are coherently added.

In this manner, by summing received signals with the inverted channel for a candidate location (e.g., 112) applied over multiple sensing devices (e.g., 102 and 104), signals add coherently corresponding to candidate locations that are emitting energy, which is manifested by the corresponding emitter signal. However, for candidate locations that are not emitting energy, the signals add incoherently and cancel on average due to random Doppler and delay profile cancellations.

In some implementations, movement of the sensing devices that leads to increased distance between the sensing devices results in greater differentiation in delay and Doppler trajectories. This can improve the ability to isolate energy profiles in specific candidate locations to a higher degree of confidence, for example, when signals from emitters at these specific candidate locations received at two or more distant sensing devices are coherently added.

As noted above, in some implementations, one or more of the sensing devices 102, 104 and 106 are satellites. In such cases, the satellites include one or more of low earth orbit (LEO) satellites, medium earth orbit (MEO) satellites, or geosynchronous orbit (GEO) satellites, or a suitable combination of LEO, MEO or GEO satellites. In some implementations, some of the sensing devices are satellites while the others are different types of mobile platforms, e.g., aerial or terrestrial vehicles. The different types of sensing devices in a multi-platform implementation contributes to increased amounts of delay and Doppler offset between the sensing devices.

Figure 2A:
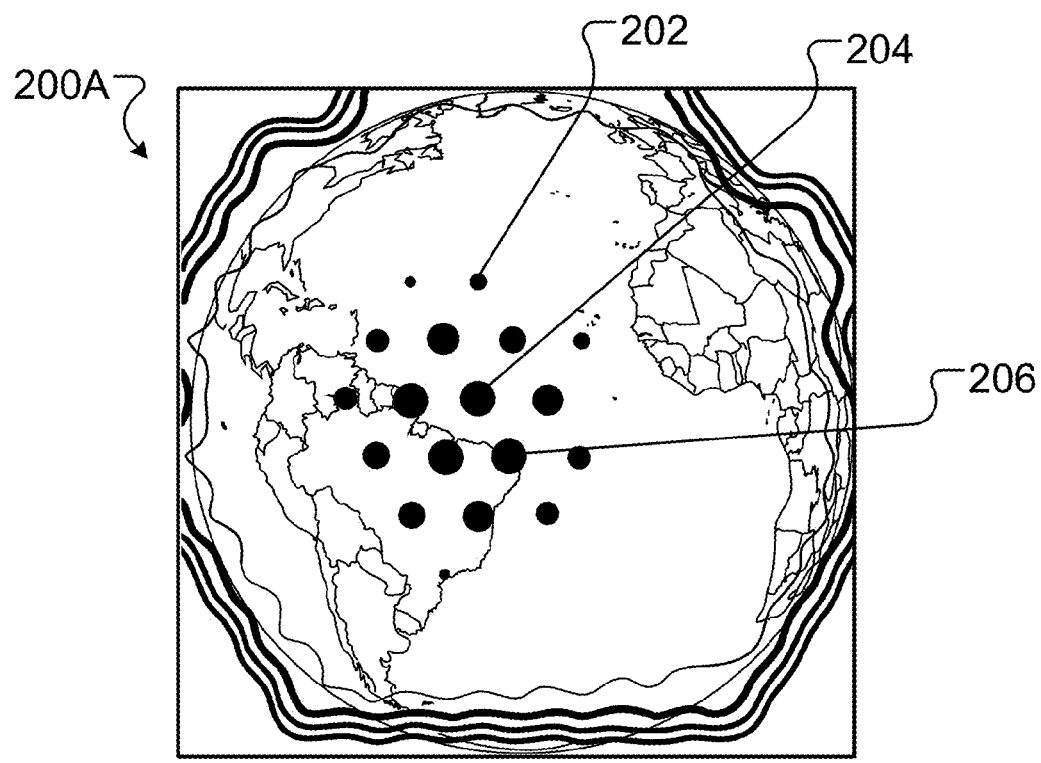
FIGS. 2A and 2B illustrate examples of energy surfaces over known areas, according to one or more implementations.
Figure 2B:
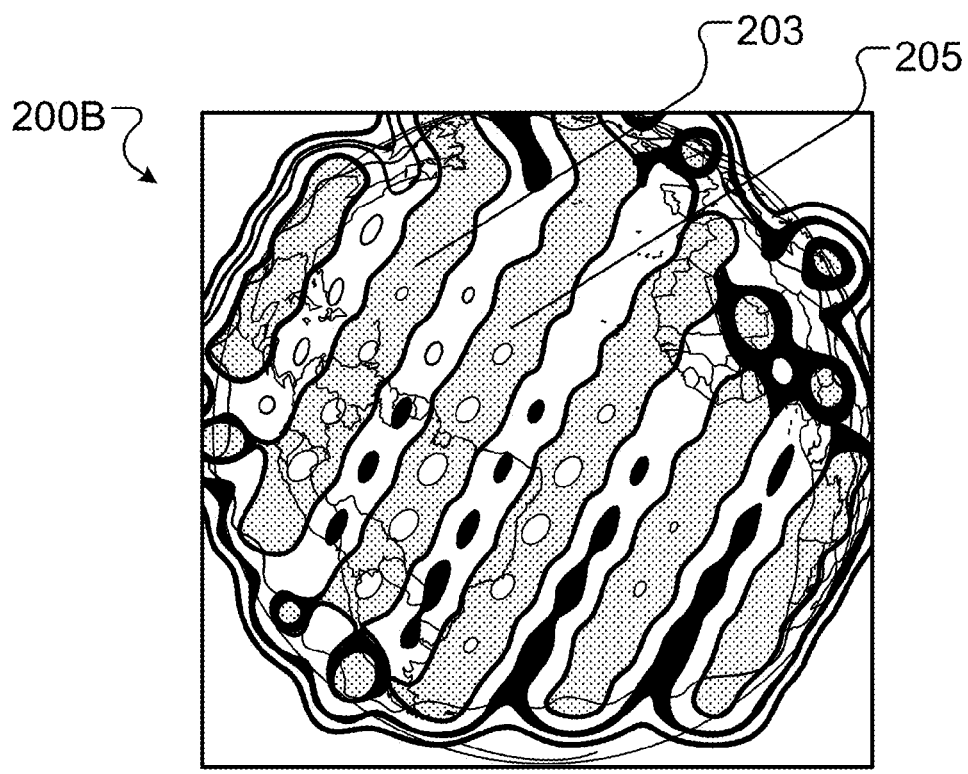

In some implementations, radio signals that are received at the plurality of sensing devices (e.g., sensing devices 102, 104 and 106) from a plurality of candidate emitter locations (e.g., from emitters corresponding to the candidate locations 112, 114, 116, 118 and 119) are integrated over a long coherent time interval to obtain an energy surface spanning a candidate grid. FIGS. 2A and 2B illustrate examples of energy surfaces 200A and 200B respectively over known areas, according to one or more implementations. Each energy surface highlights locations in a given area (for example, the area 110) that are emitting energy at one or more specific frequencies. For example, the energy surface 200A shows locations 202, 204 and 206, among others, that are emitting energy. The energy surface 200A is used to map the locations of one or more unknown emitters of unknown signals, based on determining locations where the radio signals, which are received at sensing devices as described previously, add coherently. For example, one or more of the locations 202, 204 and 206 correspond to locations of emitters in the area of interest (e.g., one or more of the locations 202, 204 and 206 can map to locations of one or more of the emitters corresponding to the candidate locations 112, 114 and 116 in the area 110).

A specific track, Doppler, signal or sensing device profile has a given autocorrelation in space, time and frequency, which is a measure that determines accuracy in estimates of each of space, time and frequency variables to obtain a significant distance metric (e.g., the autocorrelation is measure of how wide the energy is spread out in time, frequency, and space within the search grid), and can require various grid sampling densities to accurately sample the space or area that include emitters. For example, a first signal with a strong autocorrelation in space can be sampled using a lower grid sampling density (e.g., sensing the first signal using sensing devices at a lower number of points in space, and/or at more widely spaced points in space) compared to a second signal with a relatively weaker autocorrelation in space. For the second signal, a higher grid sampling density may be used, such as sensing the second signal using sensing devices at a higher number of points in space, and/or at more closely spaced points in space, compared to the case for the first signal.

In some implementations, a search strategy is employed to determine the location of the emitters. Initially a coarse wide area grid search is performed over the area of interest. Once a sub-area is identified corresponding to the target location, then a more refined search is performed over the more sub-area. In the coarse wide area search, the sensing devices operate to sense signals at a limited first number of locations along their trajectories. In the refined search, the sensing devices operate to sense signals at a second number of locations along their trajectories, where the second number of locations are greater than the first number of locations. For example, a wide search can be in a 100×100 square mile grid, searching in increments of 10×10 square meters or 100×100 square meters; while a refined search can be in a 0.5×0.5 square mile grid, searching in increments of 0.1×0.1 square meters. In some implementations, the first number of locations and the second number of locations are preselected, e.g., determined by an administrator or operator monitoring the search functions. In some implementations, the locations along a trajectory at which a sensing device operates to sense signals are stored in memory coupled to the sensing device. One or more processors on board each sensing device execute instructions stored in the memory to perform the sensing function, e.g., monitor, receive and process signals, when the movement trajectory of the sensing device places it at one of the preselected locations along its trajectory. The instructions enable the sensing devices to perform the coarse area search, e.g., sensing at the first number of locations, and/or the refined search, e.g., sensing at the second number of locations. For example, a first search can be performed over the area represented by the energy surface 200A. One or more sub-regions, e.g., 203 and 205 as shown in the energy surface 200B, are identified based on the first search, and a second, more fine-grained search is performed in these sub-regions. The granularity of each grid location considered in the second search is higher (e.g., each grid location is smaller or more fine grained) compared to that in the first search. Accordingly, a sensing device senses signals at a greater number of locations in the second search compared to the number of locations in the first search. As an illustrative example, when locating a radio beacon at sea, two or more sensing devices are operated to initially perform a coarse search over a wide area of the sea to determine candidate locations. Subsequently, the sensing devices are operated to perform a fine-grained search over a smaller region of the sea that corresponds to one or more locations or sub-regions identified in the initial search as candidates for the location of the radio beacon.

In some implementations, a search strategy that is used depends on the density of emitter locations. For sparsely populated areas (e.g., few candidate locations and/or widely separated candidate locations), a first search strategy is used where each grid location in the area considered has a first dimension. For densely populated areas (e.g., large number of candidate locations and/or closely-spaced candidate locations), a second search strategy is used where each grid location in the area considered has a second dimension that is smaller than the first dimension, such that the second search is more fine grained or high resolution compared to the first search. For example, the energy surface 200A may represent a sparsely populated area that is searched using a coarse search strategy. In contrast, the energy surface 200B may represent a densely populated area that is searched using a fine-grained search strategy. As an illustrative example, a coarse search strategy can be used to measure cellular spectrum occupancy and usage density in sparsely populated rural areas, but a fine grained search strategy can be used in more densely populated urban areas, or to cover with greater precision targeted areas that are of interest to spectrum enforcement agencies.

The energy surfaces have distinct energy peaks in desired emitter and sensing device dynamics scenarios. An energy peak indicates a high level of confidence in the estimate of the emitter location. The error bounds in the search strategies are characterized to be robust in the configurations of interest through measurement. Robustness in the error bounds indicate that location estimates for the emitters corresponding to the signals of interest can be obtained with high confidence.

In some implementations, one or more of the various BCI computations and searches, e.g., computations of the time delay and Doppler frequency offset trajectories for two or more sensing devices that are receiving the emitter signals, coherent integration of radio signals to generate energy estimates and energy surface grids, and searches over the energy surfaces, are performed in one of the sensing devices. For example, the sensing device 102 performs the various computations and searches in some implementations. In such cases, the radio signals received at the different sensing devices from the various emitters are transmitted to the sensing device 102 from the other sensing devices. For example, the sensing device 104 sends, over a communications link 132 established between the sensing devices 102 and 104, the radio signals that are received at the sensing device 104 from various emitters, such as the radio signals 112c and 112d received from the emitter at the candidate location 112. In such implementations, a sensing device that performs the computations, e.g., sensing device 102, controls and/or monitors the operations performed by the other sensing devices. For example, the sensing device 102 sends instructions to the sensing devices 104 and/or 106, to control the movement of the sensing devices along their respective trajectories, to operate their sensors to receive signals from ground emitters, and/or to send the received signals to the receiver station at preselected time intervals. The instructions sent from the sensing device 102 control at what locations along the respective trajectories (e.g., along trajectory 104a for sensing device 104) the sensing devices operate their corresponding sensors to receive the signals. As described previously, the locations can be a first number of locations for a coarse search and/or a second number of locations for a refined search. In some implementations, the instructions for the sensing device 102 are uploaded to the sensing device 102, and/or updated at particular time instants and re-uploaded, from the receiver station 120.

As described in greater detail in the following sections, in some implementations, the various BCI computations and searches are performed upon determining that the clocks of the sensing devices are synchronized with a reference clock. For example, the sensing device performing the computations, e.g., sensing device 102, sends instructions to the sensing devices 104 and/or 106, to synchronize their respective system clocks with a reference clock signal. The reference clock signal can be one of a Global Navigation Satellite System (GNSS) signal or a Global Positioning System (GPS) signal. Alternatively, the reference clock signal can be sent by the sensing device 102 to the sensing devices 104 and 106. For example, the reference clock signal can correspond to the system clock of the sensing device 102. In this manner, the system clocks of the sensing devices whose emitter signal readings are used in the computations (e.g., sensing devices 104 and 106) are synchronized with one another (and also with the clock of the sensing device 102 that is performing the computations). In some implementations, synchronizing the system clocks of the sensing devices allows the system to know to a high degree of accuracy when emitter signals arrive at multiple sensors; this knowledge effects the spatial resolution or error precision in the estimation of the emitter location.

In some implementations, the sensing device 102 performs the computations and/or initiates searches upon determining that the clocks of the other sensing devices are synchronized with one another. For example, the sensing device 102 receives acknowledgement signals from the sensing devices 104 and 106, which indicate that their system clocks are successfully synchronized with the reference signal. The sensing device 102 determines that the synchronization reference signal is the same for both the sensing devices 104 and 106, and accordingly determines that the sensing devices 104 and 106 are synchronized with one another. Subsequently, the sensing device 102 processes the emitter signals read by the sensing devices 104 and 106, and performs the coherent computations.

In some cases, performing the computations on a sensing device, e.g., sensing device 102, reduces the need for downlink communications channel spectrum (e.g., to the receiver station 120), and increases the capacity of the system 100 in terms of number of searches per pass (e.g., per trajectory movement of the sensing devices over the area 100), number of searches per day, or number of searches per fixed downlink quantity, among others.

In some implementations, one or more of the various BCI computations and searches noted above are performed in the receiver station 120. The receiver station 120 includes a gateway with RF transponders, which receives signals from the sensing devices 102, 104 and 106 in some implementations. For example, when one or more of the sensing devices are spacecraft, the receiver station 120 can include a terrestrial satellite gateway that communicates with the spacecraft. In some implementations, one or more of the sensing devices 102, 104 and 106, among others, forward to the gateway 120 the radio signal information that are received at the sensing devices from the emitters. For example, a communications link 134 is established between the sensing device 102 and the receiver station 120, while a communications link 136 is established between the sensing device 104 and the receiver station 120. The sensing device 102 sends to the receiver station 120, over the communications link 134, the radio signals that are received at the sensing device 102 from various emitters, such as the radio signals 112a and 112b received from the emitter at the candidate location 112. Similarly, the sensing device 104 sends to the receiver station 120, over the communications link 136, the radio signals that are received at the sensing device 104 from various emitters, such as the radio signals 112c and 112d received from the emitter at the candidate location 112. In such implementations, the receiver station 120 controls and/or monitors the operations performed by the sensing devices. For example, the receiver station 120 sends instructions to the sensing devices 102, 104 and/or 106, to control the movement of the sensing devices along their respective trajectories, to operate their sensors to receive signals from ground emitters, and/or to send the received signals to the receiver station at preselected time intervals. The instructions sent from the receiver station 120 control at what locations along the respective trajectories (e.g., along trajectory 102a for sensing device 102 or along trajectory 104a for sensing device 104) the sensing devices operate their corresponding sensors to receive the signals. As described previously, the locations can be a first number of locations for a coarse search and/or a second number of locations for a refined search.

The receiver station 120 performs the various computations and searches based on receiving the information from the sensing devices. In some implementations, operations corresponding to the BCI techniques are performed at the receiver station 120 within a datacenter environment. The techniques can be executed at the site of the receiver station 120, or forwarded (e.g., through a dedicated physical communications link or over an Internet connection) to a datacenter that is connected to the receiver station 120.

In a manner similar to that described above, in some implementations, the receiver station 120 performs the various BCI computations and searches upon determining that the clocks of the sensing devices are synchronized with a reference clock signal. For example, the receiver station 120 sends instructions to the sensing devices 102, 104 and/or 106, to synchronize their respective system clocks with a reference clock signal. The reference signal can be one of a Global Navigation Satellite System (GNSS) signal or a Global Positioning System (GPS) signal. Alternatively, the reference clock signal can be sent by the receiver station 120 to the sensing devices 102, 104 and/or 106. For example, the reference clock signal can correspond to the system clock of the receiver station 120. In this manner, the system clocks of the sensing devices whose signal readings are used in the computations (e.g., sensing devices 102, 104 and/or 106) are synchronized with one another and, in some implementations, also with the system clock of the receiver station 120.

In some implementations, the receiver station 120 performs the computations and/or initiates coarse or refined searches using the sensing devices upon determining that the clocks of the sensing devices are synchronized (e.g., with the reference signal and/or with one another). For example, the receiver station 120 receives acknowledgement signals from the sensing devices 102, 104 and/or 106, which indicate that the system clocks of the respective sensing devices are successfully synchronized with the reference signal. The receiver station 120 determines that the synchronization reference signal is the same for the sensing devices 102, 104 and 106, and accordingly determines that the sensing devices 102, 104 and 106 are synchronized with one another. Subsequently, the receiver station 120 processes the emitter signals read by the sensing devices 102, 104 and/or 106, and performs the computations for the BCI techniques.

In some implementations, a combination of one or more of the sensing devices, e.g., one or more of the sensing devices 102, 104 and 106, and the receiver station 120, perform the various BCI computations and searches noted above. For example, in some implementations, one or more of the sensing devices determine the time delay and Doppler frequency offset trajectories, while the receiver station performs the coherent integration of radio signals, energy surface generation, and search functions over areas of interest. Other suitable work distributions are also possible. The following section describes the various operations that are performed. It is to be understood that the operations can all be performed in one or more of the sensing devices 102, 104 or 106, or at the receiver station 120, or by a suitable combination of both.

An emitter, e.g., corresponding to the candidate location 112, emits a radio signal represented by the time series s(t). When received by several sensor radios $r_i$ (e.g., by the sensors aboard one or more of the sensing devices 102 and 104) along differing tracks x, y, z(i, t) (e.g., 102a and/or 104a), the signal s(t) undergoes a time varying time delay function and a time varying frequency offset function that is characterized by the distance of the path between the candidate location x, y, z(j, t) (e.g., candidate location 112 in the area 110) and the position x, y, z(i, t) of a sensing device, and the relative motion of the emitter and the sensing device. For each combination i, j, a delay function delay(i, j, t) and a Doppler offset function dop(i, j, t) are spatially obtained, e.g., by computing the propagation rate and differential velocity measure of the signal through free space or other medium given the known location trajectories over time. The delay function and the Doppler offset function are inverted, e.g., by advancing time according to the prior delay profile, to obtain corresponding inverse functions $\text{delay}^{-1}(i, j, t)$ and $\text{dop}^{-1}(i, j, t)$ respectively. In some implementations, the delay and Doppler offset functions are obtained in units of Hertz (Hz).

In some implementations, the inverse operations are performed to remove one or more of propagation delay, dilation and rotation. The inverse function estimates, which are also referred to as inverted channels, are generated based on predictions of emitter locations and information about the known trajectories of the sensing devices, as given by equation (1).

$$\text{Inverted channel} = \hat{H}^{-1}(i,j,t) \quad (1)$$

In equation (1), the inverted channel for a sensing device i (e.g., one of sensing device 102 or sensing device 104) is computed based on a signal transmitted from candidate location j and received by the sensing device i at time t.

Received signal estimates of $\hat{s}_{i,j}(t)$ are obtained (where $\hat{s}_{i,j}(t)$ is the estimate for a signal transmitted from a candidate location j and received by a sensing device i at time t) for a given emitter location (e.g., candidate location 112) and a given sensing device (e.g., sensing device 102) by applying the delay and Doppler functions to the received signal through a time interpolation/re-sampling (e.g., to advance the signal in time by an amount that is equivalent to an amount by which the signal was delayed during propagation at each instant) and shifting process as well as by mixing with a local digital oscillator. In this context, mixing with a local digital oscillator is performed by running an oscillator at the negative frequency of the Doppler offset at each instant based on propagation. The resulting complex value is multiplied by the received signal to obtain the received signal estimate. The signal estimate $\hat{s}_{i,j}(t)$ is based on the estimated inverted channel corresponding to the location j and the sensor i, as shown by equation (2).

$$\hat{s}_{i,j}(t) = \text{conv}(r(i,t), \hat{H}^{-1}(i,j,t)) \quad (2)$$

In equation (2), cony is a convolution function and r(i, t) is a measure of a radio signal received at sensor i at time t.

Once inverted signal estimates are obtained, e.g., using equations (1) and (2) above, a distance metric is used between pairs of the inverted signal estimates to measure the energy emitted from the candidate location in the target area (e.g., area 110), which is given by equation (3). The coherent arrival of an unknown radio signal through an inverted channel, as determined using equations (1) and (2), at multiple sensors is used to evaluate a distance metric, as given by equation (3). The distance metric is used to score the different locations on the ground for similarity of the estimated radio signals transmitted by the emitters.

$$E_j = D(\hat{s}_{i_0,j}, \hat{s}_{i_1,j}) \quad (3)$$

In equation (3), $\hat{s}_{i_0,j}$ is the estimate of signal strength corresponding to a radio signal that is received from candidate emitter location j (e.g., candidate location 112) at sensing device $i_0$ (e.g., 102), while $\hat{s}_{i_1,j}$ is the estimate of signal strength corresponding to a radio signal that is received from candidate emitter location j at sensing device $i_1$ (e.g., 104). $E_j$ is the estimate of energy (e.g., in Joules) at the candidate emitter location j while D is a distance metric that is employed to obtain the estimate. An energy estimate can be computed for each pairwise set of distance metrics between sensing devices, as shown by equation (3), e.g., between sensing device pairs 102 and 104, 104 and 106, and 106 and 102.

In some implementations, the distance metric D is an L2 error distance between signals, which is given by $D_{L2}(S_0(t), S_1(t)) = \int_t (S_0(t) - S_1(t))^2$ where $S_0(t) = \hat{s}_{i_0,j}$ and $S_1(t) = \hat{s}_{i_1,j}$. In some implementations, the distance metric D is an LN error distance between signals, which is given by $D_{LN}(S_0(t), S_1(t)) = \int_t (S_0(t) - S_1(t))^N$. In some implementations, the distance metric D is a complex cross power distance between signals, which is given by $D_{cp}(S_0(t), S_1(t)) = \text{Abs}(\int_t S_0(t)^* \text{conj}(S_1(t)))$, or given by $D_{cp}(S_0(t), S_1(t)) = \int_t \text{real}(S_0(t)^* \text{conj}(S_1(t)))$, where $S_0(t) = \hat{s}_{i_0,j}$ and $S_1(t) = \hat{s}_{i_1,j}$. Other distance metrics can also be used, e.g., depending on power, interference, and signal structure scenarios. Some distance metrics are better in single emitter environments (e.g., a sparsely populated area that includes one or few emitters) and some are better in dense emitter environments, depending on the constructive addition of the power of the target emitter, and how the estimates non-coherently effect the noise from non-target emitters.

Accordingly, in some implementations, depending on the nature of the environment in which the candidate emitter locations are searched, different distance metrics are employed. For example, a sensing device or the receiver station 120, depending on the entity controlling the search and/or performs the computations, selects a particular distance metric for the BCI computations based on determining the environment in which the emitter candidate location is present. In some implementations, upon receiving the signals collected by the sensing devices, the receiver station 120 (or a sensing device performing the computations, e.g., 102, depending on the implementation), determines that the environment is a sparsely populated area, or a dense emitter environment, e.g., based on the number of signal measurements received from the sensing devices, and/or based on prior knowledge about the area under measurement (such as area 110). If the receiver station 120 determines that the area is sparsely populated, the receiver station 120 selects a first distance metric. On the other hand, if the receiver station 120 determines that the area is densely populated, the receiver station 120 selects a second distance metric that is different from the first distance metric. For example, in the case of multiple interferers, certain distance metrics which do not amplify interference noise are preferred. However, in some other implementations, the same distance metric is used irrespective of the environment. In this context, examples of multiple interferers include, in some implementations, cell towers spaced every few miles apart and transmitting on the same channel. Examples of single interferers include, in some implementations, a ship with a radio in the middle of an ocean or a sea.

In some implementations, a search over an energy surface area is performed following computation of the distance metrics as described above. The search can employ both coarse and fine-grained search strategies, as discussed above. Due to integration of distance metrics over a long time/pass interval, locations of very low energy emitters, e.g., emitters with radio signals in the range of −20 to −40 decibels (dB) signal to noise ratio (SNR) that is received at the sensing devices can be determined in the presence of noise. This is useful for mapping of weak terrestrial signals using sensing devices that are geographically distant from the locations of the signal emitters. For example, the techniques can be used to map cellular, commercial and other emitters for spectrum regulation, mapping and deployment planning purposes. Additionally or alternatively, the techniques can be used to track a company's inventory map emitters with characteristics of interest, among other commercial applications. In some implementations, maps of emitter locations or information about specific emitters can be used as analytics that are computable using the above techniques for dealing with low SNR scenarios.

In some implementations, the above computations and the associated search strategies are performed using one or more processors on board the sensing devices (e.g., using computing units at one or more of the sensing devices 102, 104 or 106) or at the receiver station 120. In some implementations, the BCI techniques provide efficient computations for a large number of candidate emitter locations, and associated searches over large and/or high-density areas, by concurrently evaluating multiple candidate locations. For example, massively parallel graphics processing unit (GPU) architectures, such as Theano or Tensorflow™, are used in some implementations for rapid implementation and deployment, e.g., using a massively concurrent architecture on a GPU hardware. Accordingly, in some implementations, one or more of the sensing devices (e.g., one or more of sensing devices 102, 104 or 106), or the receiver station 120 include processors with parallel processing architectures, such as one or more massively parallel GPUs. In such implementations, the receiver station 120 (or a sensing device performing the computations, e.g., sensing device 102) employs the on-board parallel processors to perform the computations for the BCI techniques, e.g., for a large number of candidate emitter locations.

In some implementations, using a great degree of parallelism in the operations renders the computations efficient to run on many cores at lower clock rates for energy efficiency. The BCI techniques are adapted to achieve gross data parallelism in a number of dimensions, such as candidate location, candidate distance metric, time segmentation, and a number of others. For example, considering the candidate location partitioning, the BCI techniques achieve gross parallelism by using many-core computers (e.g., both central processing unit (CPU) and GPU) to divide and compute various metrics concurrently. Workload can be easily divided by candidate location, by time section, or several other potential partitionings, which can lead to speedups by a factor of hundred or more. In addition to improving the processing efficiency of the sensing devices, the energy expenditure of the devices can be reduced, as noted below.

The operations can be further scaled over dense many-core GPU platforms for power and search time efficiency, as well as over large clusters of compute nodes. For example, in some implementations, the instructions for the BCI computations are customized, e.g., configured to be processed efficiently, using parallel processors. In doing so, the time to perform a single search process can be minimized, and a location estimate can be achieved with minimal latency. Accordingly, in some implementations, the sensing devices (e.g., one or more of the sensing device 102, 104 and 106), and/or the receiver station 120, use massively parallel GPU compute platforms with low size, weight and power that are intended for mobile and power/heat limited applications. For example, the sensing devices can use the NVIDIA Tegra™ TX1 computing platform. This is advantageous when the sensing devices are spacecraft or aerial platforms. In such implementations, by using BCI techniques that can make efficient use of processors and other hardware with features of parallel processing, multiple cores, or both, the amount of energy expended in performing the operations are limited, thereby extending the life of the stored energy for the devices performing the computations. This is particularly useful for spacecraft such as satellites, or aerial platforms such as UAVs, that have limited energy sources (e.g., on-board batteries).

As noted previously, in some implementations, the system clock of a sensing device is synchronized with the system clock of other sensing devices. For example, the system clocks of sensing devices 102, 104 and 106 are synchronized with one another. The system clocks are synchronized such that stable inverted delay time and Doppler offset functions can be estimated, and so that estimated signals may be added coherently between sensing devices (e.g., using equation (3)) over non-negligible integration times.

In some implementations, the system clocks of the sensing devices are synchronized based on deriving the system clocks from a common reference signal, e.g., a Global Navigation Satellite System (GNSS) signal, a Global Positioning System (GPS) signal, or a reference signal sent by the receiver station 120. In some implementations, the system clocks of the sensing devices are synchronized based on a reference clock signal sent from one of the sensing devices. For example, the sensing device 102 can be used as a reference. In such cases, the sensing device 102 sends a reference clock signal to the other sensing devices, e.g., 104 and 106, to synchronize their respective system clocks with the system clock of sensing device 102. The reference signal can be sent from one sensing device to the others over direct radio or optical crosslinks between the sensing devices, such as the communications link 132 between sensing devices 102 and 104.

As noted above, in some implementations, a number of ground locations from a grid or otherwise is searched to measure the distance metric of the arriving signals at each potential location to generate a geographic map of radio energy. In some implementations, initially a large grid is selected. However, the dimensions of each unit of space, or cell, in the grid is considered at a sufficient spacing granularity to ensure that a measurable distance metric at the expected maximum offset from a grid point (e.g., (maximum distance between points)/2) can be obtained. For example, this includes the half-power spatial distance of the candidate distance metric's spatial auto-correlation function.

Once a coarse location is obtained, another measurement can be performed using a fine grid of points surrounding the best candidate location from the prior search. In this manner, a finer location estimate for the target emitter location can be determined. Additionally, in some implementations, least-squares polynomial function fits or other interpolation methods are used to obtain smooth peak estimates between grid points when finding a peak.

In some implementations, the above computations can be extended from two to three or more sensors by computing the distance metrics pairwise between each set of adjacent points and combining the distance metrics through some means, for example, multiplicatively, additively, or some other suitable combining metric that scales the distance metrics differently in comparison to each other. For example, in some implementations, the distance metrics are given by one of equations (4) and (5).

$$D(\hat{s}_{i_0,j}, \hat{s}_{i_1,j}, \hat{s}_{i_2,j}) = D(\hat{s}_{i_0,j}, \hat{s}_{i_1,j}) * D(\hat{s}_{i_1,j}, \hat{s}_{i_2,j}) * D(\hat{s}_{i_0,j}, \hat{s}_{i_2,j}) \quad (4)$$

$$D(\hat{s}_{i_0,j}, \hat{s}_{i_1,j}, \hat{s}_{i_2,j}) = D(\hat{s}_{i_0,j}, \hat{s}_{i_1,j}) + D(\hat{s}_{i_1,j}, \hat{s}_{i_2,j}) + D(\hat{s}_{i_0,j}, \hat{s}_{i_2,j}) \quad (5)$$

In equations (4) and (5), $\hat{s}_{i_0,j}$ is the estimate of signal strength corresponding to a radio signal that is received from candidate emitter location j (e.g., candidate location 112) at sensing device $i_0$ (e.g., sensing device 102), $\hat{s}_{i_1,j}$ is the estimate of signal strength corresponding to a radio signal that is received from emitter location j at sensing device $i_1$ (e.g., sensing device 104), and $\hat{s}_{i_2,j}$ is the estimate of signal strength corresponding to a radio signal that is received from emitter location j at sensing device $i_2$ (e.g., sensing device 106).

Figure 3:
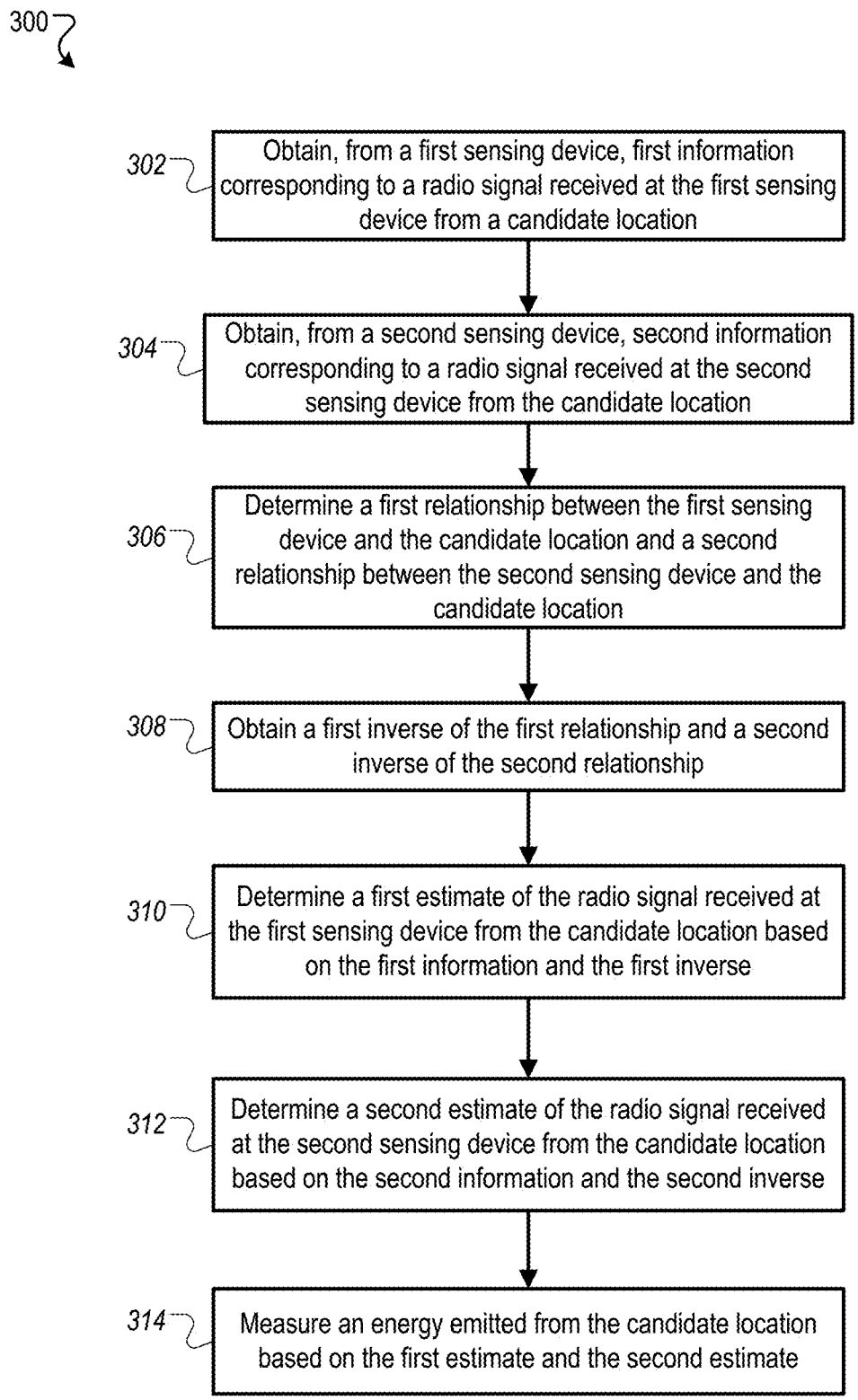
FIG. 3 illustrates an example of a process for measuring energy emitted from a candidate location in an area, according to one or more implementations.

FIG. 3 illustrates an example of a process 300 for measuring energy emitted from a candidate location in an area, according to one or more implementations. The process 300 can be performed by components of the system 100. For example, the process 300 can be performed by two or more of the sensing devices 102, 104 and 106, by the receiver station 120, or by a suitable combination of the sensing devices and the receiver station 120. Accordingly, the following sections describe the process 300 with respect to the system 100. However, the process 300 also can be performed by other suitable devices or systems.

In some implementations, the process 300 is performed by one or more processors associated with the respective device(s) performing the process 300. For example, the sensing device 102, or the sensing device 104 or 106, can perform the process 300 by executing instructions corresponding to the process 300 that are stored in memory coupled to the respective sensing device. The instructions are executed by one or more processors coupled to the respective sensing device. Additionally or alternatively, in some implementations, the receiver station 120 can perform the process 300 by executing instructions corresponding to the process 300 that are stored in memory coupled to the receiver station 120. The instructions are executed by one or more processors coupled to the receiver station 120.

In some implementations, the process 300 is performed by a plurality of sensing devices, e.g., M sensing devices, where M is an integer greater than 3. For example, the process 300 can be performed by the sensing devices 102, 104 and 106, and additional sensing devices in the system 100.

At 302, first information corresponding to a radio signal received at a first sensing device from a candidate location is obtained from the first sensing device. For example, the sensing device 102 receives a radio signal 112a from the emitter corresponding to the candidate location 112. The received radio signal is sent to a processor on board the sensing device 102 in some implementations. The received radio signal is sent to a processor in the receiver station 120 in some implementations.

At 304, second information corresponding to a radio signal received at a second sensing device from the candidate location is obtained from the second sensing device. For example, the sensing device 104 receives a radio signal 112c from the emitter corresponding to the candidate location 112. The received radio signal is sent to a processor on board one of the sensing devices, e.g., sensing device 102, in some implementations. The received radio signal is sent to a processor in the receiver station 120 in some implementations.

In some implementations, information corresponding to additional radio signals are obtained from other sensing devices. For example, the sensing device 106 receives a radio signal from the emitter corresponding to the candidate location 112. The received radio signal is sent to a processor on board one of the sensing devices, e.g., sensing device 102, in some implementations. The received radio signal is sent to a processor in the receiver station 120 in some implementations.

At 306, a first relationship between the first sensing device and the candidate location and a second relationship between the second sensing device and the candidate location are determined. For example, one or more of a time delay function and a Doppler offset function corresponding to the sensing device 102 and the candidate location 112 is determined based on knowledge of the trajectory 102a of the sensing device 102. Similarly, one or more of a time delay function and a Doppler offset function corresponding to the sensing device 104 and the candidate location 112 is determined based on knowledge of the trajectory 104a of the sensing device 104.

Additionally, in some implementations, one or more of a time delay function and a Doppler offset function corresponding to other sensing devices, such as sensing device 106, and the candidate location 112 is determined based on knowledge of the trajectory of the sensing device, e.g., trajectory 106a of the sensing device 106.

At 308, a first inverse of the first relationship and a second inverse of the second relationship are obtained. For example, one or more of an inverse of the time delay function and an inverse of the Doppler offset function corresponding to the sensing device 102 and the candidate location 112 are determined, e.g., based on equation (1). Similarly, one or more of an inverse of the time delay function and an inverse of the Doppler offset function corresponding to the sensing device 104 and the candidate location 112 are determined, e.g., based on equation (1).

Additionally, in some implementations, one or more of an inverse of the time delay function and an inverse of the Doppler offset function corresponding to other sensing devices, such as the sensing device 106, and the candidate location 112 are determined, e.g., based on equation (1).

At 310, a first estimate of the radio signal received at the first sensing device from the candidate location is determined based on the first information and the first inverse. For example, an estimate of the signal energy corresponding to the emitter at the candidate location 112 is determined for the sensing device 102 based on the radio signal received at the sensing device 102 from the candidate location 112, and based on the inverse functions computed at 308, such as the inverse of the time delay function and/or the inverse of the Doppler offset function corresponding to the sensing device 102 and the candidate location 112. In some implementations, the first estimate is obtained using equation (2).

At 312, a second estimate of the radio signal received at the second sensing device from the candidate location is determined based on the second information and the second inverse. For example, an estimate of the signal energy corresponding to the emitter at the candidate location 112 is determined for the sensing device 104 based on the radio signal received at the sensing device 104 from the candidate location 112, and based on the inverse functions computed at 308, such as the inverse of the time delay function and/or the inverse of the Doppler offset function corresponding to the sensing device 104 and the candidate location 112. In some implementations, the second estimate is obtained using equation (2).

In some implementations, additional estimates of the signal energy corresponding to the emitter at the candidate location 112 is determined for other sensing devices, such as sensing device 106, based on the radio signal received at the particular sensing device from the candidate location 112, and based on the inverse functions computed at 308 for the particular sensing device, such as the inverse of the time delay function and/or the inverse of the Doppler offset function corresponding to the sensing device 106 and the candidate location 112. In some implementations, the additional estimates are obtained using equation (2).

At 314, an energy emitted from the candidate location is measured based on the first estimate and the second estimate. For example, a distance metric is computed pairwise for the estimates of the signal energy corresponding to the emitter at the candidate location 112 that are determined for the sensing devices 102 and 104 at 312. By applying the distance metric, the energy emitted from the candidate location 112 is determined. In some implementations, the computation of the distance metric and obtaining the energy estimate are based on equation (3).

In some implementations, the energy emitted from the candidate location is measured based on the first estimate, the second estimate and additional estimates. For example, distance metrics are computed pairwise for the estimates of the signal energy corresponding to the emitter at the candidate location 112 that are determined at 312 for pairs of sensing devices in the system 100, such as sensing device pairs 102 and 104, 104 and 106, 106 and 102, including other pairs involving additional sensing devices in the system 100. By applying the distance metric, the energy emitted from the candidate location 112 is determined. In such implementations, the computation of the distance metric and obtaining the energy estimate are based on one of equations (4) and (5).

In the above manner, the process 300 is used in some implementations to measure energy estimates corresponding to multiple candidate locations in a preselected area, based on radio signals received from emitters corresponding to the candidate locations at a plurality of sensing devices, such as sensing devices 102, 104 and 106. In some implementations, to obtain the energy estimates, a determination is made whether the system clocks of the multiple sensing devices are synchronized. This is achieved, for example, by querying the plurality of sensing devices for their system clock values. Additionally or alternatively, this is achieved, by sending a reference clock signal to the sensing devices and confirming that the clocks of the sensing devices are synchronized with the reference clock signal (e.g., upon receiving acknowledge responses from the sensing devices).

By measuring the energy estimates corresponding to the multiple candidate locations, an energy surface spanning the preselected area is determined. As noted previously, a search strategy is employed over the area to determine the actual locations of one or more target emitters, based on apriori knowledge of candidate locations corresponding to the target emitters.

Figure 4:
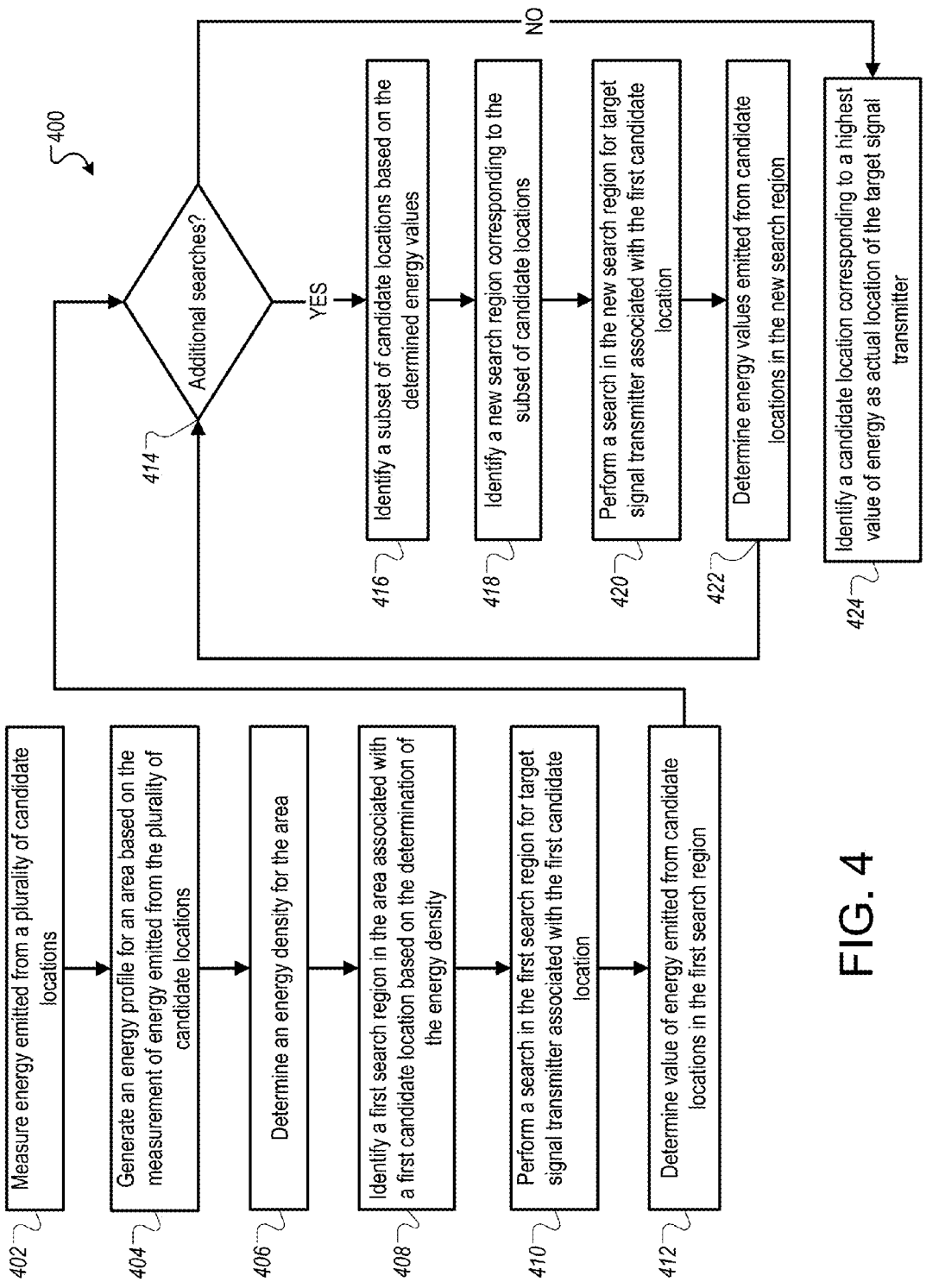
FIG. 4 illustrates an example of a process 400 performing a search over an energy surface corresponding to an area, according to one or more implementations.

FIG. 4 illustrates an example of a process 400 for performing a search over an energy surface corresponding to an area, according to one or more implementations. The process 400 can be performed by components of the system 100. For example, the process 400 can be performed by one or more of the sensing devices 102, 104 and 106, by the receiver station 120, or by a suitable combination of the sensing devices and the receiver station 120. Accordingly, the following sections describe the process 400 with respect to the system 100. However, the process 400 also can be performed by other suitable devices or systems.

In some implementations, the process 400 is performed by one or more processors associated with the respective device(s) performing the process 400. For example, the sensing device 102, or the sensing device 104 or 106, can perform the process 400 by executing instructions corresponding to the process 400 that are stored in memory coupled to the respective sensing device. The instructions are executed by one or more processors coupled to the respective sensing device. Additionally or alternatively, in some implementations, the receiver station 120 can perform the process 400 by executing instructions corresponding to the process 400 that are stored in memory coupled to the receiver station 120. The instructions are executed by one or more processors coupled to the receiver station 120.

In some implementations, the process 400 is performed following the process 300. For example, an energy surface spanning a preselected area is determined using the process 300. Subsequently, the process 400 is used to perform one or more searches over the area to determine actual locations of one or more target emitters.

At 402, energy emitted from a plurality of candidate locations are measured. For example, as shown at 314, a distance metric is computed pairwise for the estimates of radio signal energy that are received at two or more sensing devices (e.g., 102, 104 and 106) from emitters corresponding to candidate locations (e.g., 112, 114, 116, 118 and 119) in a preselected area (e.g., 110). By applying the distance metric, the energy emitted from the candidate locations are estimated.

At 404, an energy profile for an area is generated based on the measurement of energy emitted from the plurality of candidate locations. For example, an energy surface (e.g., energy surface 200A) is generated for the area 110 based on the energy estimates corresponding to candidate locations 112, 114, 116, 118 and 119, among others. Each point in the area 110 is mapped to an energy value that is included in the energy surface.

At 406, an energy density for the area is determined. For example, the grid points in the energy surface that correspond to non-zero energy values are identified. As an illustrative example, the locations 202, 204 and 206, among others, correspond to grid points in the energy surface 200A with non-zero energy values. The distance between the non-zero energy grid points and the clustering of the grid points in each unit block of the energy surface are determined.

At 408, a first search region is identified in the area associated with a first candidate location based on the determination of the energy density. For example, a search strategy is employed to determine the location of emitters in the area. Upon determining the densities of the grid points in the energy surface, a search region is identified. As described previously, the search region can be a coarse search region, such as the area covered by the energy surface 200A. Alternatively, the search region can be a fine-grained smaller area, such as the sub-region 203 or 205.

At 410, a search is performed in the first search region for target signal transmitter associated with the first candidate location. For example, a first search is performed over the area represented by the energy surface 200A.

At 412, value of energy emitted from candidate locations in the first search region are determined. For example, the energy values corresponding to the locations 202, 204 and 206 are obtained by performing a search in the energy surface 200A.

At 414, a determination is made whether additional searches are to be performed. For example, the first search can be a coarse wide area grid search over the area of interest, such as the energy surface 200A. Once a sub-area is identified corresponding to the target location, then a more refined search can be performed over the more sub-area.

If a determination is made at 414 that additional searches are to be performed, then at 416, a subset of candidate locations is identified based on the determined energy values. For example, by searching the energy surface 200A, one or more of candidate locations 202, 204 and 206 are identified. In some implementations, the energy value for each point or location in the energy surface is compared to a preselected threshold value, and candidate locations that correspond to energy values higher than the threshold are selected. Alternatively, in some implementations, candidate locations that correspond to energy values lower than the threshold are selected. The threshold value can be set by a user of the system, or it can be set as a design parameter. The threshold value can be updated depending on the desired targets to be identified by the search. For example, for low energy emitters, which can be difficult to distinguish from the noise floor, the threshold can be set to a low first value, while for medium or higher energy emitters, the threshold can be set to a higher value in comparison to the first value. For example, for low energy emitters, the threshold can be set to maximize probability of detection. In contrast, for high-energy emitters, the threshold can be set to minimize probability of false alarm.

In some implementations, relative energy values are considered instead of absolute energy values. The energy value of an emitter can be computed by integrating the arriving signal power for a specified time period. As an example, for a signal that is received at −120 decibel-milliwatts (dBm) and integrated for 1 second, the range for low energy emitters can range from $10^{-20}$ joules up to $10^{-15}$ joules; the range of energy values from $10^{-15}$ joules to $10^{-10}$ joules can correspond to medium energy emitters; and energy values greater than $10^{-10}$ joules can correspond to high energy emitters. Other thresholds can be used in different implementations.

In some implementations, the energy values for each point or location in the energy surface are ordered, e.g., in either ascending or descending order of values. The candidate location that corresponds to the highest energy value, or candidate locations that correspond to the top M highest energy values (where M is a positive integer greater than 1), are selected. In implementations where the top M highest every values are selected, M is a system parameter. M can be set by a user of the system, or it can be set as a design parameter. M can be updated depending on the desired targets to be identified by the search. For example, for low energy emitters, M can be set to a first value, while for medium or higher energy emitters, M can be set to a lower value in comparison to the first value set for low energy emitters.

At 418, a new search region corresponding to the subset of candidate locations is identified. For example, upon determining the subset of candidate locations at 416, one or more areas that cover a known range around the subset of candidate locations, and include the subset of candidate locations, are identified as new search region(s).

At 420, a search is performed in the new search region for a target signal transmitter associated with the first candidate location. For example, a first search is performed over a wide area (e.g., corresponding to energy surface 200A) to determine one or more candidate locations, as described above. Subsequently, a fine-grained search is performed over a smaller region (e.g., corresponding to region 203 and/or 205) that cover the one or more locations identified in the first search.

At 422, energy values emitted from candidate locations in the new search region are determined. For example, energy values corresponding to the locations in the sub region covered 203 or 205 are obtained by performing a search in the respective region. Subsequently, the process reverts to 414 to determine whether additional searches are to be performed, and iterates over 416-422 as long as more searches are to be performed to identify candidate locations with the desired level of granularity or specificity regarding the locations.

If a determination is made at 414 that additional searches are not to be performed, then at 424, a candidate location corresponding to a highest value of energy is identified as actual location of the target signal transmitter. For example, in some implementations, following the first search at 412, the candidate location corresponding the highest value of estimated energy in the region searched is identified as the actual location of the target signal emitter. In some implementations, following iterative searches performed at 416-422, a location is identified with finer granularity as the actual location of the target signal emitter.

In some implementations, actual locations of two or more target signal emitters are identified. For example, the candidate locations corresponding to the N highest values of estimated energy (where N is a positive integer greater than 1) in the region searched are identified as actual locations of N target signal emitters. In some implementations, the candidate locations are identified as actual locations only if the corresponding estimated energy are greater than a known threshold energy level. In some implementations, N is a system parameter. N can be set by a user of the system, or it can be set as a design parameter.

Figure 5:
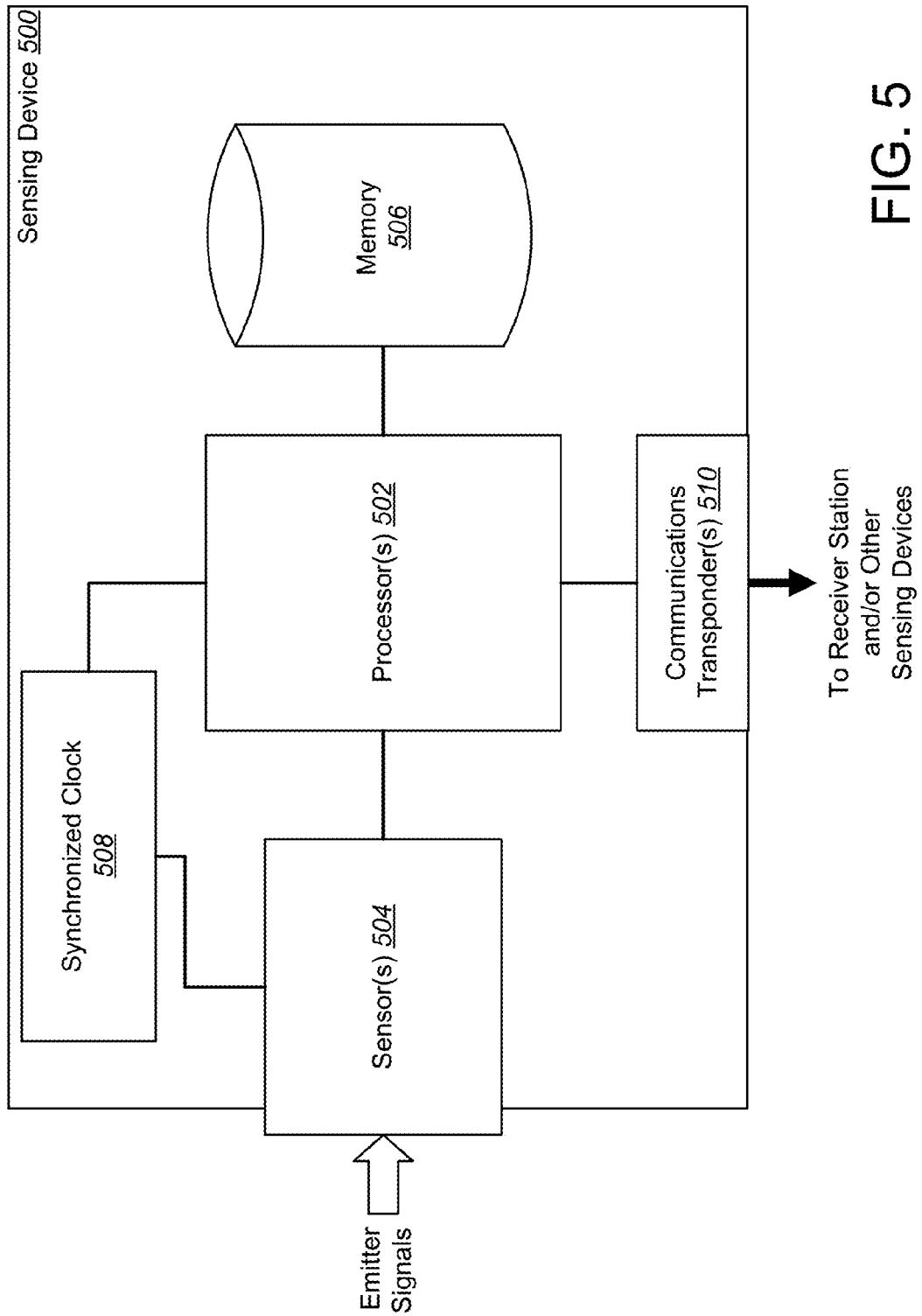
FIG. 5 illustrates a block diagram of an example of a sensing device, according to one or more implementations.

FIG. 5 illustrates a block diagram of an example of a sensing device 500, according to one or more implementations. The sensing device 500 is similar to one or more of the sensing devices 102, 104 and 106 in some implementations. The sensing device 500 includes one or more processors 502, one or more sensors 504, memory 506, a synchronized clock 508 and one or more communications transponders 510.

In some implementations, the sensing device 500 includes one processor 502. In other implementations, the sensing device includes multiple processors, which are collectively indicated as 502. The one or more processors 502 execute instructions to perform various operations. In some implementations, the one or more processors 502 execute instructions that are stored in the memory 506. The instructions include signal processing and control functions. As described previously, in some implementations, the instructions include operations corresponding to performing BCI computations and/or controlling various sensing devices to perform coarse or fine-grained search over energy surfaces. In some implementations, the one or more processors 502 execute instructions stored in the memory 506 to perform the operations of the process 300 and/or the process 400.

In some implementations, the one or more processors 502 are general purpose multiprocessors. In some implementations, the one or more processors 502 include digital signal processing (DSP) features, general-purpose pre-processor(s) (GPP), general-purpose graphics processing unit(s) (GPGPU), or field-programmable gate array(s) (FPGA). In some implementations, the one or more processors 502 include parallel processing capabilities, e.g., the one or more processors include GPU hardware. In such cases, the instructions corresponding to the BCI computations and/or the search operations are customized such that they are executed efficiently using the parallel processors 502. This leads to improvement in the functioning of the sensing device 100, e.g., leading to faster execution, lower expenditure of energy of the sensing device 500, and/or lower heat generation in the sensing device 500. In this manner, the parallel execution of the instructions corresponding to the BCI computations and/or the search operations extend the lifecycle of the sensing device 500. This is useful, for example, when the sensing device 500 is a spacecraft, such as a satellite, e.g., a device that is not readily replaceable.

In some implementations, the sensing device 500 includes one sensor 504. In other implementations, the sensing device includes multiple sensors, which are collectively indicated as 504. The one or more sensors 504 receive radio signals, e.g., signals from emitters on the Earth's surface. In some implementations, the one or more sensors 504 include antenna elements that detects radio frequency signals. Each of the sensor(s) 504 also includes a receiver or tuner and a filter, which process the signals detected by the antenna elements. Each of the one or more sensors 504 further includes a digitizer, e.g., an analog to digital (A/D) converter, which converts the received analog emitter signals into digital signals for processing by the processor(s) 502. In some implementations, the one or more sensors 504 share the antenna elements with other components of the sensing device 500, e.g., the communications transponder(s) 510.

The memory 506 stores instructions that are executed by the processor(s) 502, as described above. The memory 506 also stores emitter signals detected by the sensor(s) 504, and/or the results of the computations and search functions that are performed by the sensing device 500. In some implementations, the memory 506 includes one or more of random access memory (RAM), various types of read-only memory (ROM), and other long-term storage memory, such as non-volatile flash memory. Additionally or alternatively, in some implementations, the memory 506 includes hard drive storage, or other suitable storage media, such as storage disks.

The synchronized clock 508 is a system clock for the sensing device 500. As noted previously, in some implementations the computations for the BCI techniques are performed when the system clocks of the sensing devices are synchronized with one another. The synchronized clock 508 is synchronized with a stable reference signal, e.g., a GNSS or GPS signal, or by receiving a reference signal directly from another sensing device 500 or from a receiver station (such as receiver station 120).

In some implementations, the sensing device 500 includes one communications transponder 510. In other implementations, the sensing device includes multiple communications transponders, which are collectively indicated as 510. The one or more communications transponders 510 communicate with other sensing devices, and/or with receiver stations. In some implementations, the communications transponder(s) include downlink/uplink communications transponder(s), which communicate with a receiver station (e.g., receiver station 120) for command and control instructions, to transmit emitter signals received at the sensing device 500, and/or processed information about the emitter signals following processing performed on board the sensing device 500. In some implementations, the communications transponder(s) include crosslink communications transponder(s), which communicates with other nearby sensing devices to coordinate command and control functions, tasking, synchronous observation, sharing recordings and computing information about multi channel recordings, among other operations.

Figure 6:
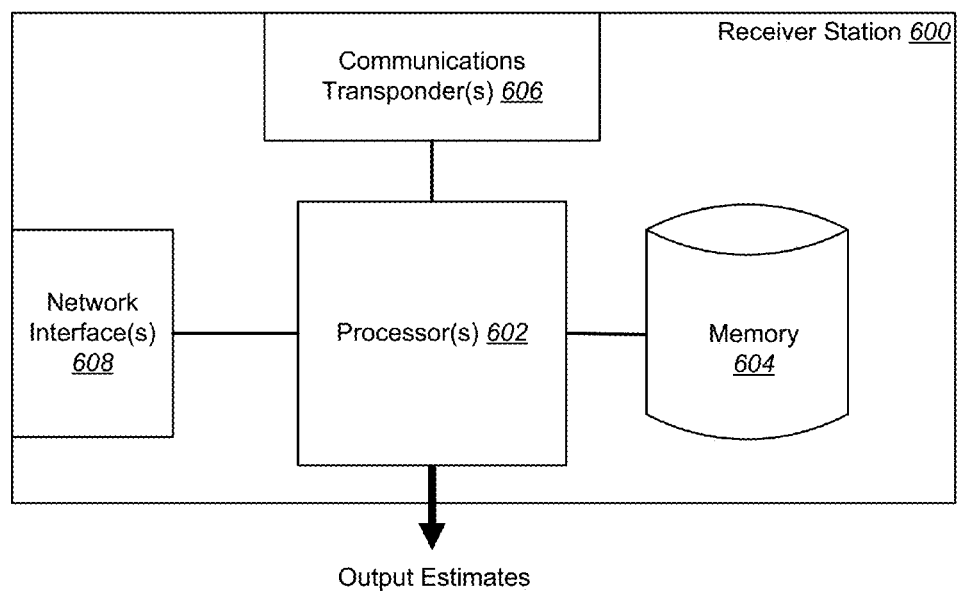
FIG. 6 illustrates a block diagram of an example of a receiver station, according to one or more implementations.

FIG. 6 illustrates a block diagram of an example of a receiver station 600, according to one or more implementations. The receiver station 600 is similar to the receiver station 120 in some implementations. The receiver station 600 includes one or more processors 602, memory 604, one or more communications transponders 606 and one or more network interfaces 608.

In some implementations, the receiver station 600 includes one processor 602. In other implementations, the receiver station 600 includes multiple processors, which are collectively indicated as 602. In some implementations, the one or more processors 602 execute instructions that are stored in the memory 604. As described previously, in some implementations, the instructions include operations corresponding to performing BCI computations and/or controlling various sensing devices (e.g., one or more of sensing devices 102, 104 and 106) to perform coarse or fine-grained search over energy surfaces to identify emitter locations. These operations include, among others, processing emitter signals received from the sensing devices into estimates of locations, users, timing, and other useful signal metrics. In some implementations, the one or more processors 602 execute instructions stored in the memory 604 to perform the operations of the process 300 and/or the process 400. The processors 602 output the estimates to a user or administrator, e.g., through a display coupled to the receiver station 600, and/or transmit the estimates to other devices, e.g., other receiver stations or network nodes.

In some implementations, the one or more processors 602 are general purpose multiprocessors. In some implementations, the one or more processors 602 include digital signal processing (DSP) features, general-purpose pre-processor(s) (GPP), general-purpose graphics processing unit(s) (GPGPU), or field-programmable gate array(s) (FPGA), or a suitable combination of these. In some implementations, the one or more processors 602 include parallel processing capabilities, e.g., the one or more processors include GPU hardware. In such cases, the instructions corresponding to the BCI computations and/or the search operations are customized such that they are executed efficiently using the parallel processors 602. This leads to improvement in the functioning of the receiver station 600, e.g., leading to faster execution, lower expenditure of energy, and/or lower heat generation. In this manner, the parallel execution of the instructions corresponding to the BCI computations and/or the search operations improve the functionality of the receiver station 600. This is useful, for example, when the receiver station 600 processes a large number of emitter signals, e.g., covering a large area and/or multiple areas and that are received from a plurality of sensing devices.

The memory 604 stores instructions that are executed by the processor(s) 602, as described above. The memory 604 also stores emitter signals that are received from one or more sensing devices, and/or the results of the computations and search functions that are performed by the receiver station 600. In some implementations, the memory 604 stores additional information, such as application logs, process tasking information, planning and analysis information, among others.

In some implementations, the memory 604 includes one or more of random access memory (RAM), various types of read-only memory (ROM), and other long-term storage memory, such as non-volatile flash memory, hard drive storage, storage disks, or other suitable storage media.

In some implementations, the receiver station 600 includes one communications transponder 606. In other implementations, the receiver station 600 includes multiple communications transponders, which are collectively indicated as 606. In some implementations, the communications transponder(s) 606 include downlink/uplink communications transponder(s), which are used to communicate with the sensing devices, e.g., to transmit command and control instructions, receive emitter signals obtained by the sensors on the sensing devices, or processed information about these signals that are generated by one or more sensing devices. In some implementations, the receiver station 600 uses the downlink/uplink communications transponders to send updates to software (e.g., updates to the algorithms) stored in sensing device memory.

In some implementations, the receiver station 600 includes one network interface 608. In other implementations, the receiver station 600 includes multiple network interfaces, which are collectively indicated as 608. The receiver station connects to one or more terrestrial networks, e.g., using local area network (LAN) or wide area network (WAN) connections, through the network interfaces 608.

The receiver station 600 communicates with other receiver stations or other network devices on the ground, or to remote datacenters, through the terrestrial networks that are accessed over the network interfaces 608. In this manner, in some implementations, the processors 602 communicate the computed estimates, which are noted above, to other network devices or receiver stations through the network interfaces 608.

The disclosed and other examples can be implemented as one or more computer program products, for example, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and the computer program can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   obtaining, from a first sensing device, first information corresponding to a radio signal received at the first sensing device from a candidate location;
   obtaining, from a second sensing device, second information corresponding to a radio signal received at the second sensing device from the candidate location;
   determining that a clock corresponding to the first sensing device is synchronized with a clock corresponding to the second sensing device;
   determining a first relationship between the first sensing device and the candidate location and a second relationship between the second sensing device and the candidate location;
   obtaining a first inverse of the first relationship and a second inverse of the second relationship;
   determining a first estimate of the radio signal received at the first sensing device from the candidate location based on the first information and the first inverse, and a second estimate of the radio signal received at the second sensing device from the candidate location based on the second information and the second inverse; and
   conditioned on determining that the clock corresponding to the first sensing device is synchronized with the clock corresponding to the second sensing device, measuring an energy emitted from the candidate location based on the first estimate and the second estimate.

2. The method of claim 1, wherein determining the first relationship between the first sensing device and the candidate location comprises:
   determining a delay associated with the radio signal received at the first sensing device from the candidate location; and
   determining a Doppler offset associated with the radio signal received at the first sensing device from the candidate location,
   wherein at least one of the delay or the Doppler offset is determined based on a known trajectory of the first sensing device.

3. The method of claim 2, wherein obtaining the first inverse of the first relationship comprises:
   determining an inverse of the delay associated with the radio signal received at the first sensing device from the candidate location; and
   determining an inverse of the Doppler offset associated with the radio signal received at the first sensing device from the candidate location.

4. The method of claim 1, wherein obtaining the first inverse of the first relationship comprises:
   obtaining a prediction of the candidate location;
   obtaining knowledge of a trajectory of the first sensing device;
   determining a position of the first sensing device at a first time based on the knowledge of the trajectory; and
   obtaining the first inverse of the first relationship based on the prediction of the candidate location and the position of the first sensing device at the first time.

5. The method of claim 4, wherein determining the first estimate of the radio signal comprises:
   computing a convolution of: (i) the first information corresponding to the radio signal received at the first sensing device and (ii) the first inverse of the first relationship that is based on the prediction of the candidate location and the position of the first sensing device at the first time.

6. The method of claim 1, wherein determining the second relationship between the second sensing device and the candidate location comprises:
   determining a delay associated with the radio signal received at the second sensing device from the candidate location; and
   determining a Doppler offset associated with the radio signal received at the second sensing device from the candidate location,
   wherein at least one of the delay or the Doppler offset is determined based on a known trajectory of the second sensing device.

7. The method of claim 6, wherein obtaining the second inverse of the second relationship comprises:
   determining an inverse of the delay associated with the radio signal received at the second sensing device from the candidate location; and
   determining an inverse of the Doppler offset associated with the radio signal received at the second sensing device from the candidate location.

8. The method of claim 1, wherein obtaining the second inverse of the second relationship comprises:
   obtaining a prediction of the candidate location;
   obtaining knowledge of a trajectory of the second sensing device;
   determining a position of the second sensing device at a first time based on the knowledge of the trajectory; and
   obtaining the second inverse of the second relationship based on the prediction of the candidate location and the position of the second sensing device at the first time,
   wherein determining the second estimate of the radio signal comprises computing a convolution of: (i) the second information corresponding to the radio signal received at the second sensing device and (ii) the second inverse of the second relationship that is based on the prediction of the candidate location and the position of the second sensing device at the first time.

9. The method of claim 1, wherein determining the first estimate of the radio signal received at the first sensing device from the candidate location based on the first inverse comprises (i) applying one or more of a time interpolation, re-sampling and shifting process to the first inverse, and (ii) mixing the first inverse with a local digital oscillator, and
   wherein determining the second estimate of the radio signal received at the second sensing device from the candidate location based on the second inverse comprises (i) applying one or more of a time interpolation, re-sampling and shifting process to the second inverse, and (ii) mixing the second inverse with a local digital oscillator.

10. The method of claim 1, wherein measuring the energy emitted from the candidate location based on the first estimate and the second estimate comprises determining a distance metric between the first estimate and the second estimate, and measuring the energy as a function of the distance metric,
    wherein the distance metric is based on a coherent reception of the radio signal at the first sensing device and the second sensing device, and
    wherein the coherent reception of the radio signal is based on the clock corresponding to the first sensing device being synchronized with the clock corresponding to the second sensing device.

11. The method of claim 10, wherein the distance metric includes one of an L2 error distance, and LN error distance or a complex cross power distance.

12. The method of claim 1, further comprising:
    measuring energy emitted from a plurality of candidate locations, wherein radio signals from the plurality of candidate locations are received at a plurality of sensing devices including the first sensing device and the second sensing device, and wherein information corresponding to the radio signals from the plurality of candidate locations are obtained from the plurality of sensing devices;
    generating an energy profile for a geographic region based on the measurement of energy emitted from the plurality of candidate locations;
    determining an energy density for the geographic region, wherein the energy density is proportional to a number of the candidate locations corresponding to which emitted energy are measured;
    identifying a first search area in the geographic region associated with a first candidate location based on the determination of the energy density; and
    performing a search in the first search area for target signal transmitter associated with the first candidate location.

13. The method of claim 12, wherein performing the search for signal transmitters in the first search area comprises:
    determining a highest value of energy emitted from candidate locations in the first search area; and identifying a candidate location corresponding to the highest value of energy as actual location of the target signal transmitter.

14. The method of claim 12, wherein performing the search for signal transmitters in the first search area comprises:
    determining a highest value of energy emitted from candidate locations in the first search area; and
    identifying a candidate location corresponding to the highest value of energy;
    determining a second search area in the geographic region associated with the identified candidate location, wherein the second search area corresponds to a sub-region of the first search area;
    performing a search in the second search area for the target signal transmitter;
    determining a highest value of energy emitted from candidate locations in the second search area; and
    identifying a candidate location corresponding to the highest value of energy as actual location of the target signal transmitter.

15. The method of claim 12, further comprising:
    comparing energy emitted from candidate locations in the first search area to a threshold energy value;
    determining a subset of candidate locations in the first search area with emitted energy greater than the threshold energy value;
    identifying a second search area associated with the subset of candidate locations; and
    performing a search in the second search area for the target signal transmitter.

16. The method of claim 1, wherein the first sensing device includes a sensor on a first mobile platform that is communicably coupled to a ground receiving station, wherein obtaining the first information corresponding to the radio signal received at the first sensing device from the candidate location comprises obtaining, at the ground receiving station, the first information from the first mobile platform,
    wherein the second sensing device includes a sensor on a second mobile platform that is communicably coupled to the ground receiving station, and wherein obtaining the second information corresponding to the radio signal received at the second sensing device from the candidate location comprises obtaining, at the ground receiving station, the second information from the second mobile platform.

17. The method of claim 16, wherein the first mobile platform and the second mobile platform include at least one of a Low Earth Orbit (LEO) satellite, a Medium Earth Orbit (MEO) satellite, a Geosynchronous Orbit (GEO) satellite, a nano satellite, an unmanned aerial vehicle (UAV) or a terrestrial vehicle.

18. The method of claim 1, wherein obtaining the first information corresponding to the radio signal received at the first sensing device from the candidate location comprises obtaining, at a computing unit onboard the first sensing device, the first information corresponding to the radio signal from a sensor coupled to the first sensing device,
    wherein the first sensing device is communicably coupled to the second sensing device, and wherein obtaining the second information corresponding to the radio signal received at the second sensing device from the candidate location comprises:
    receiving, at a network interface of the first sensing device from the second sensing device, the second information from the second sensing device; and
    sending, from the network interface of the first sensing device to the computing unit onboard the first sensing device, the second information.

19. The method of claim 18, wherein the first sensing device and the second sensing device include at least one of a Low Earth Orbit (LEO) satellite, a Medium Earth Orbit (MEO) satellite, a Geosynchronous Orbit (GEO) satellite, a nano satellite, an unmanned aerial vehicle (UAV), a terrestrial vehicle, a spacecraft or a mobile platform.

20. The method of claim 1, wherein the clock corresponding to the first sensing device and the clock corresponding to the second sensing device are synchronized with a reference clock, and
    wherein determining that the clock corresponding to the first sensing device is synchronized with the clock corresponding to the second sensing device comprises:
    receiving, from the first sensing device, a first signal indicating that the clock corresponding to the first sensing device is synchronized with the reference clock;
    receiving, from the second sensing device, a second signal indicating that the clock corresponding to the second sensing device is synchronized with the reference clock; and
    determining, based on receiving the first signal and the second signal, that the clock corresponding to the first sensing device is synchronized with the clock corresponding to the second sensing device.

21. The method of claim 20, wherein the reference clock is associated with one of a Global Navigation Satellite System (GNSS) signal, a Global Positioning System (GPS) signal, or a system clock of one of the first sensing device or the second sensing device.

22. The method of claim 20, further comprising:
    sending, to each of the first sensing device and the second sensing device, an instruction signal, the instruction signal directing the respective sensing devices to synchronize the corresponding clocks with the reference clock.

23. The method of claim 1, wherein measuring the energy emitted from the candidate location further comprises:
    obtaining, from one or more additional sensing devices, additional information corresponding to radio signals received at the one or more additional sensing devices from the candidate location;
    determining that one or more clocks corresponding to the one or more additional sensing devices are synchronized with the clocks corresponding to at least one of the first sensing device or the second sensing device;
    determining one or more relationships between the one or more additional sensing devices and the candidate location;
    obtaining one or more inverses of the one or more relationships between the one or more additional sensing devices and the candidate location;
    determining one or more estimates of the radio signals received at the one or more additional sensing devices from the candidate location based on the additional information and the one or more inverses; and
    conditioned on determining that the one or more clocks corresponding to the one or more additional sensing devices are synchronized with the clocks corresponding to at least one of the first sensing device or the second sensing device, measuring the energy emitted from the candidate location based on the first estimate, the second estimate and the one or more estimates of the radio signals received at the one or more additional sensing devices from the candidate location.

24. A non-transitory computer-readable medium storing instructions that, when executed by one or more processors, are configured to cause the one or more processors to perform operations comprising:
   obtaining, from a first sensing device, first information corresponding to a radio signal received at the first sensing device from a candidate location;
   obtaining, from a second sensing device, second information corresponding to a radio signal received at the second sensing device from the candidate location;
   determining that a clock corresponding to the first sensing device is synchronized with a clock corresponding to the second sensing device;
   determining a first relationship between the first sensing device and the candidate location and a second relationship between the second sensing device and the candidate location;
   obtaining a first inverse of the first relationship and a second inverse of the second relationship;
   determining a first estimate of the radio signal received at the first sensing device from the candidate location based on the first information and the first inverse, and a second estimate of the radio signal received at the second sensing device from the candidate location based on the second information and the second inverse; and
   conditioned on determining that the clock corresponding to the first sensing device is synchronized with the clock corresponding to the second sensing device, measuring an energy emitted from the candidate location based on the first estimate and the second estimate.

25. The non-transitory computer-readable medium of claim 24, wherein determining the first relationship between the first sensing device and the candidate location comprises:
   determining a delay associated with the radio signal received at the first sensing device from the candidate location; and
   determining a Doppler offset associated with the radio signal received at the first sensing device from the candidate location,
   wherein at least one of the delay or the Doppler offset is determined based on a known trajectory of the first sensing device.

26. The non-transitory computer-readable medium of claim 25, wherein obtaining the first inverse of the first relationship comprises:
   determining an inverse of the delay associated with the radio signal received at the first sensing device from the candidate location; and
   determining an inverse of the Doppler offset associated with the radio signal received at the first sensing device from the candidate location.

27. The non-transitory computer-readable medium of claim 24, wherein the operations further comprise:
   measuring energy emitted from a plurality of candidate locations, wherein radio signals from the plurality of candidate locations are received at a plurality of sensing devices including the first sensing device and the second sensing device, and wherein information corresponding to the radio signals from the plurality of candidate locations are obtained from the plurality of sensing devices;
   generating an energy profile for a geographic region based on the measurement of energy emitted from the plurality of candidate locations;
   determining an energy density for the geographic region, wherein the energy density is proportional to a number of the candidate locations corresponding to which emitted energy are measured;
   identifying a first search area in the geographic region associated with a first candidate location based on the determination of the energy density; and
   performing a search in the first search area for target signal transmitter associated with the first candidate location.

28. A system comprising:
   a first sensing device and a second sensing device;
   one or more processors; and
   a storage medium storing instructions that, when executed by the one or more processors, are configured to cause the one or more processors to perform operations comprising:
      obtaining, from the first sensing device, first information corresponding to a radio signal received at the first sensing device from a candidate location;
      obtaining, from the second sensing device, second information corresponding to a radio signal received at the second sensing device from the candidate location;
      determining that a clock corresponding to the first sensing device is synchronized with a clock corresponding to the second sensing device;
      determining a first relationship between the first sensing device and the candidate location and a second relationship between the second sensing device and the candidate location;
      obtaining a first inverse of the first relationship and a second inverse of the second relationship;
      determining a first estimate of the radio signal received at the first sensing device from the candidate location based on the first information and the first inverse, and a second estimate of the radio signal received at the second sensing device from the candidate location based on the second information and the second inverse; and
      conditioned on determining that the clock corresponding to the first sensing device is synchronized with the clock corresponding to the second sensing device, measuring an energy emitted from the candidate location based on the first estimate and the second estimate.

29. The system of claim 28, wherein the operations further comprise:
   measuring energy emitted from a plurality of candidate locations, wherein radio signals from the plurality of candidate locations are received at a plurality of sensing devices including the first sensing device and the second sensing device, and wherein information corresponding to the radio signals from the plurality of candidate locations are obtained from the plurality of sensing devices;
   generating an energy profile for a geographic region based on the measurement of energy emitted from the plurality of candidate locations;
   determining an energy density for the geographic region, wherein the energy density is proportional to a number of the candidate locations corresponding to which emitted energy are measured;

identifying a first search area in the geographic region associated with a first candidate location based on the determination of the energy density; and performing a search in the first search area for target signal transmitter associated with the first candidate location.

30. The system of claim 28, wherein measuring the energy emitted from the candidate location further comprises:

obtaining, from one or more additional sensing devices, additional information corresponding to radio signals received at the one or more additional sensing devices from the candidate location;

determining that one or more clocks corresponding to the one or more additional sensing devices are synchronized with the clocks corresponding to at least one of the first sensing device or the second sensing device;

determining one or more relationships between the one or more additional sensing devices and the candidate location;

obtaining one or more inverses of the one or more relationships between the one or more additional sensing devices and the candidate location;

determining one or more estimates of the radio signals received at the one or more additional sensing devices from the candidate location based on the additional information and the one or more inverses; and conditioned on determining that the one or more clocks corresponding to the one or more additional sensing devices are synchronized with the clocks corresponding to at least one of the first sensing device or the second sensing device, measuring the energy emitted from the candidate location based on the first estimate, the second estimate and the one or more estimates of the radio signals received at the one or more additional sensing devices from the candidate location.

* * * * *